(12) United States Patent  
Kusumi

(10) Patent No.: US 8,230,453 B2  
(45) Date of Patent: Jul. 24, 2012

(54) DOOR OPENING AND CLOSING MECHANISM PROVIDED AT THE FRONT OF AN APPARATUS BODY

(75) Inventor: Ryuji Kusumi, Tokyo (JP)

(73) Assignee: Sony Corporation, Tokyo (JP)

( * ) Notice: Subject to any disclaimer, the term of this patent is extended or adjusted under 35 U.S.C. 154(b) by 209 days.

(21) Appl. No.: 12/644,916

(22) Filed: Dec. 22, 2009

(65) Prior Publication Data

US 2010/0218203 A1 Aug. 26, 2010

(30) Foreign Application Priority Data

Feb. 26, 2009 (JP) ................. 2009-044213

(51) Int. Cl.  
*G11B 33/02* (2006.01)
(52) U.S. Cl. ...................................... 720/647
(58) Field of Classification Search .......... 720/601, 720/647, 646  
See application file for complete search history.

(56) References Cited

U.S. PATENT DOCUMENTS

2006/0259916 A1* 11/2006 Shinohara et al. ............ 720/646

FOREIGN PATENT DOCUMENTS

| JP | 60-74293 U | 5/1985 |
|---|---|---|
| JP | 2001-84747 | 3/2001 |
| JP | 3718933 | 9/2005 |
| JP | 2008-152885 | 7/2008 |

OTHER PUBLICATIONS

Office Action issued Mar. 29, 2011, in Japan Patent Application No. 2009-044213 (with English translation).

* cited by examiner

*Primary Examiner* — David D Davis  
(74) *Attorney, Agent, or Firm* — Oblon, Spivak, McClelland, Maier & Neustadt, L.L.P.

(57) ABSTRACT

A door opening and closing mechanism includes an apparatus body, a door configured to open and close a side face of the apparatus body, a closing mechanism configured to move the door from an open position to open the side face to a close position to close the side face, a control switch provided in the apparatus body, the control switch being operated from an operation hole opening in the side face, and a control button provided in the door and configured to press the control switch from the operation hole at the close position of the door. The control switch is provided at a position shifted from the operation hole toward the interior of the apparatus body.

6 Claims, 20 Drawing Sheets

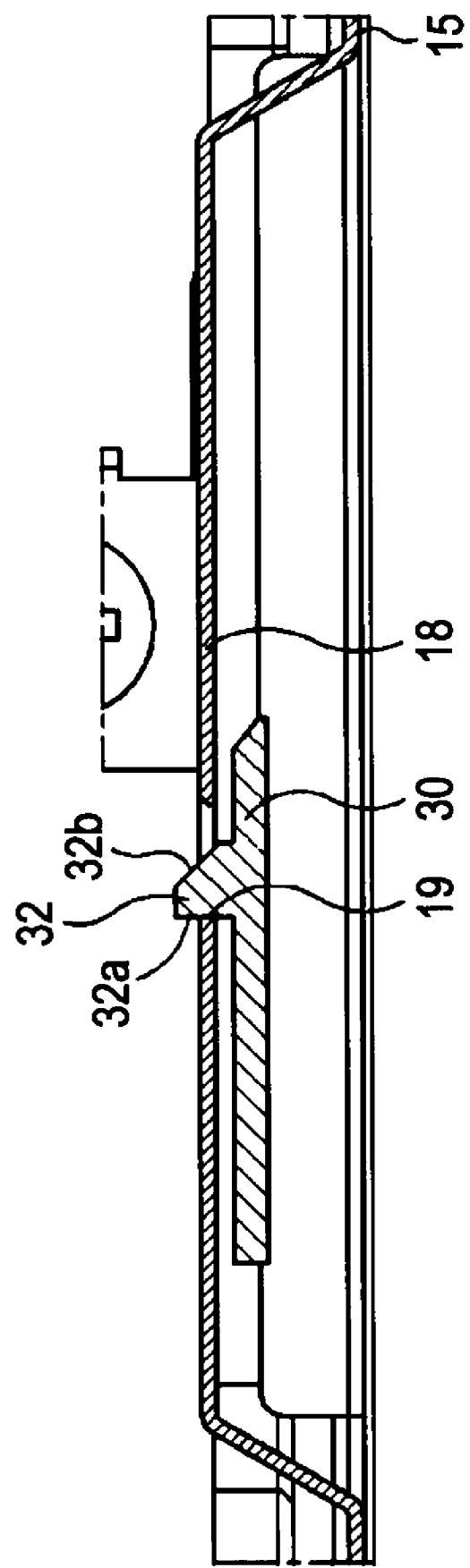

DOOR OPENING AND CLOSING MECHANISM PROVIDED AT THE FRONT OF AN APPARATUS BODY

BACKGROUND OF THE INVENTION

1. Field of the Invention

The present invention relates to a recording and/or playback apparatus for a recording medium, and more particularly, to a door opening and closing mechanism provided at the front of an apparatus body.

2. Description of the Related Art

For example, Japanese Patent No. 3718933 discloses a recording/playback apparatus for performing recording and/or playback of a disc-shaped recording medium such as a CD, a DVD, or a BD. The recording/playback apparatus is provided with a substantially rectangular door that is pivotally supported on a front surface of an apparatus body. By turning the door downward, the front surface of the apparatus body is exposed outside. The front surface of the apparatus body is provided with various control buttons, and an insertion opening for a disc tray that conveys the disc-shaped recording medium into and out of the apparatus body.

During loading and unloading of the disc-shaped recording medium, the disc tray is slid toward the front side of the apparatus body and pushes the door from behind, whereby the door is turned to an open position to expose the front surface of the apparatus body. When the door is turned to the open position, the control buttons are exposed outside and are allowed to be operated. For recording and/or playback of the disc-shaped recording medium, the disc tray is drawn into the apparatus body, and the door is then manually or automatically turned from the open position to a close position to close the front surface of the apparatus body.

To automatically turn the door between the open and close positions to open and close the front surface of the apparatus body, a turning mechanism and a power source for the door are to be provided in the apparatus body. This increases the size of the apparatus body, and also increases the number of components and production cost. In contrast, when the user manually closes the door, usability for the user is reduced. Hence, there is a demand for a recording/playback apparatus provided with a mechanism that turns a door to a close position with a simple structure.

SUMMARY OF THE INVENTION

In the recording/playback apparatus having the device for automatically turning the door to the close position, when a playback button provided on the front surface of the apparatus body is pressed in a state in which the door is placed at the open position and the disc tray is slid to the front side of the apparatus body, the disc tray is retracted and the door is then automatically turned to the close position. In this case, since the user is pressing the control button on the front surface of the apparatus body, if the door is turned to the close position, the finger of the user may be caught in the door.

When the door is provided only at a part of the front surface of the apparatus body where the disc tray is drawn in and out, the finger of the user will not be caught in the door. However, the front surface of the apparatus body is divided into the door and a board similar to the door, and this increases the number of components. Moreover, since the division line appears on the front surface of the apparatus body, the outer appearance is impaired.

In addition, since the control button provided on the front surface of the apparatus body is exposed outside via the door placed at the close position, when an opening in which the control button is to be fitted is provided in the door, it is to be large enough to avoid interference between the moving area of the opening and the control button during the pivotal movement of the door. As a result, dust enters from the opening, and accumulates at the opening and the control button. Moreover, since a large clearance is formed between the control button and the opening, the outer appearance is impaired.

It is desirable to provide a door opening and closing mechanism and a recording and/or playback apparatus in which a door is automatically turned to a close position, a front surface of an apparatus body is prohibited from being operated when being opened by the door, and the size of an opening from which a control button is exposed outside when the front surface of the apparatus body is closed is minimized.

A door opening and closing mechanism according to an embodiment of the present invention includes an apparatus body; a door configured to open and close a side face of the apparatus body; a closing mechanism configured to move the door from an open position to open the side face to a close position to close the side face; a control switch provided in the apparatus body, the control switch being operated from an operation hole opening in the side face; and a control button provided in the door and configured to press the control switch from the operation hole at the close position of the door. The control switch is provided at a position shifted from the operation hole toward the interior of the apparatus body.

A recording and/or playback apparatus according to another embodiment of the present invention includes an apparatus body; a door configured to open and close a side face of the apparatus body; a closing mechanism configured to move the door from an open position to open the side face to a close position to close the side face; a control switch provided in the apparatus body, the control switch being operated from an operation hole opening in the side face; and a control button provided in the door and configured to press the control switch from the operation hole at the close position of the door. The control switch is provided at a position shifted from the operation hole toward the interior of the apparatus body.

According to the embodiments of the present invention, the control switch is provided at the position shifted from the operation hole provided in the apparatus body toward the interior of the apparatus body, and is not pressed via the control button in a state in which the door is placed at the open position. Therefore, it is possible to avoid the circumstance in which the finger of the user is caught in the door by automatic movement of the door to the close position caused by operating the control switch in a state in which the door is placed at the open position.

BRIEF DESCRIPTION OF THE DRAWINGS

FIG. 6 is a sectional top view showing a joint state between the top plate and the chassis;

DESCRIPTION OF THE PREFERRED EMBODIMENTS

Figure 1:
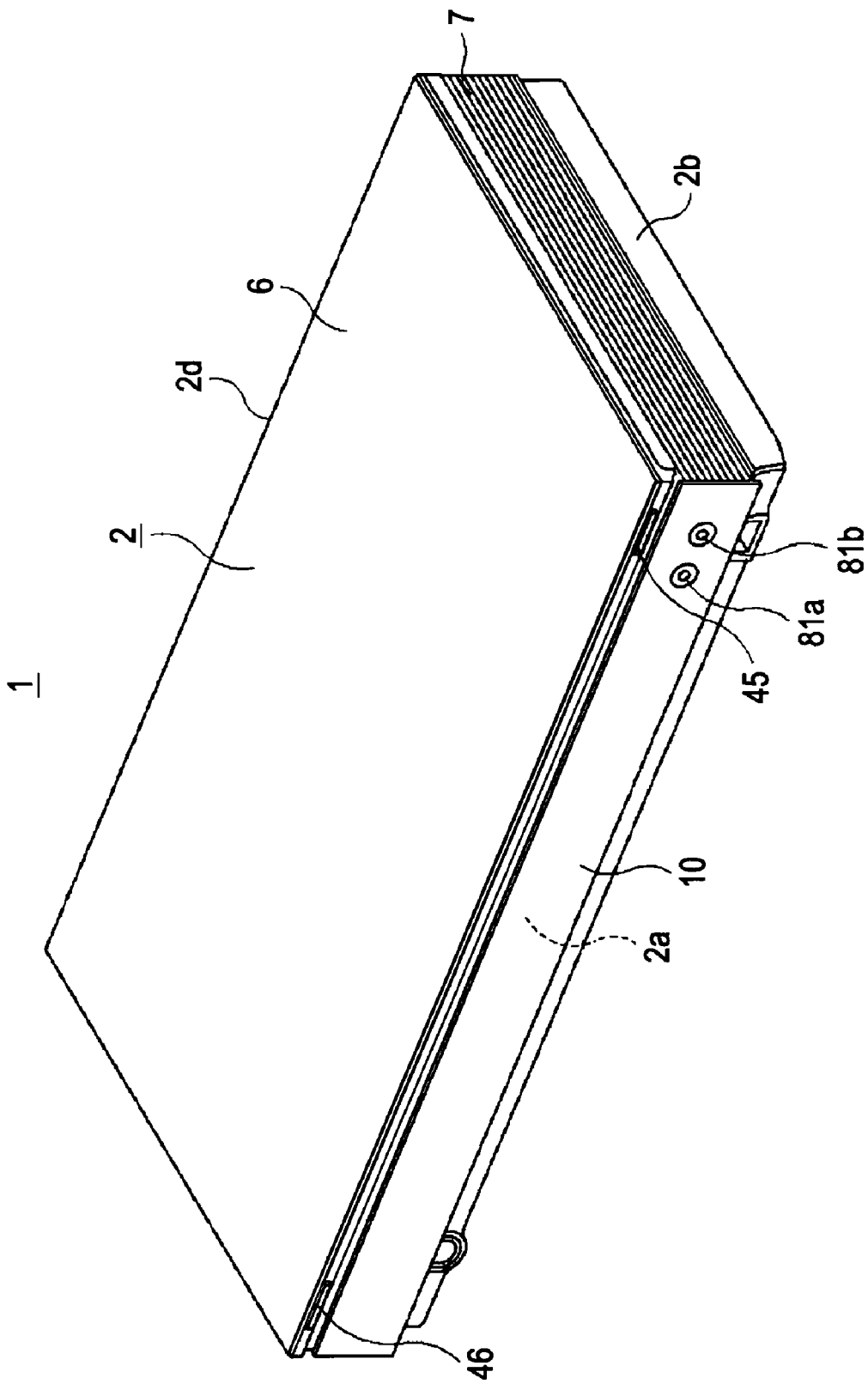
FIG. 1 is an outward perspective view of a recording/playback apparatus.
Figure 2:
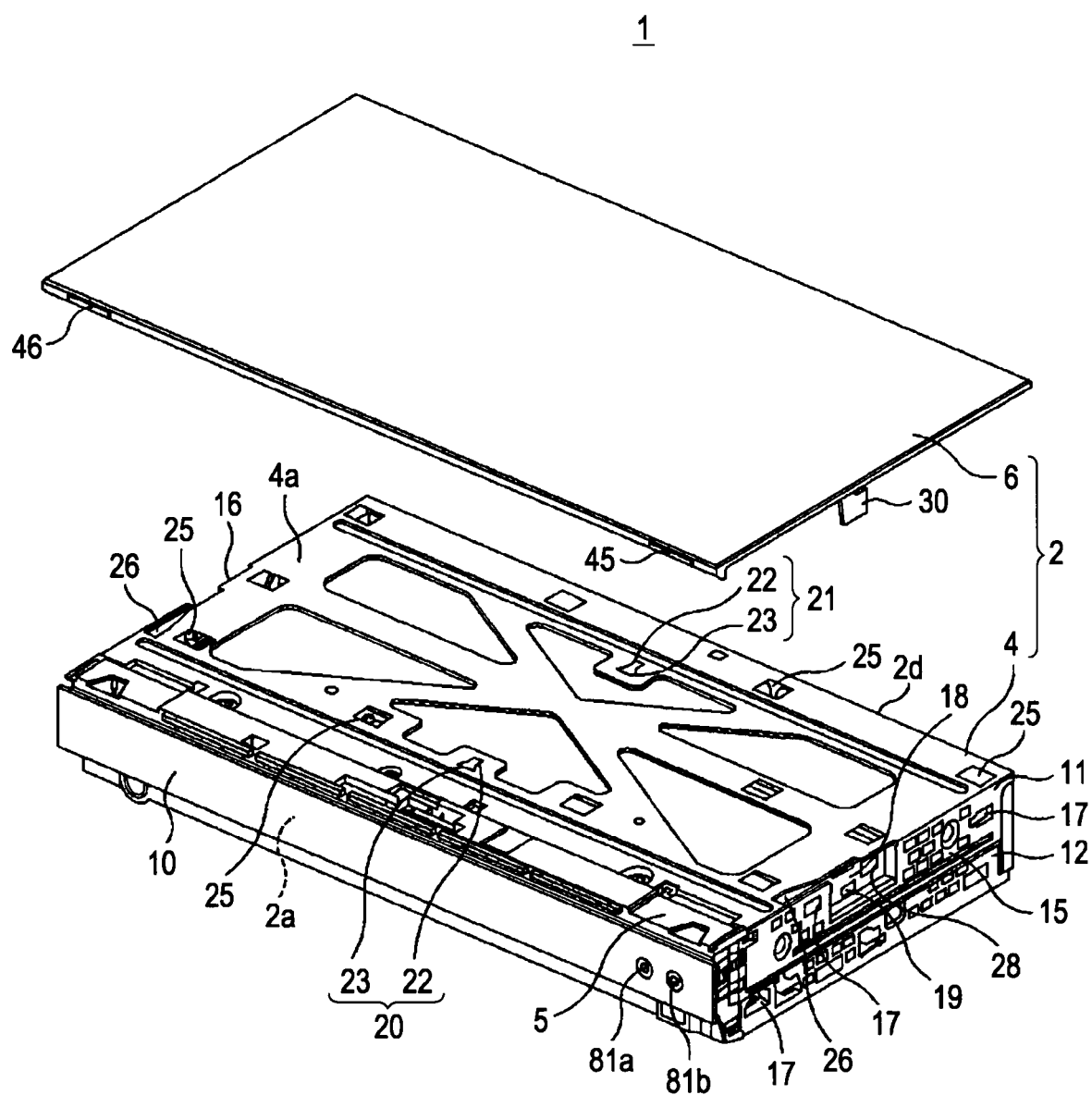
FIG. 2 is an exploded perspective view of the recording/playback apparatus.

A detailed description will be given below of a recording and/or playback apparatus according to an embodiment of the present invention that performs recording and/or playback of an optical disc, with reference to the drawings. The description will be given in the following order:

(1) apparatus body
(2) mounting method for top plate
(3) door opening and closing mechanism 1. Apparatus Body A recording/playback apparatus 1 according to an embodiment of the present invention performs recording and/or playback of an optical disc such as a CD, a DVD, or a BD. By connection to an electronic apparatus having an AV function, such as a liquid crystal television or a PC, a video camera, or a speaker, the recording/playback apparatus 1 records a television program and pictures recorded in a video camera onto an optical disc, or play backs pictures recorded on an optical disc and outputs the pictures from a monitor or a speaker. Referring to FIGS. 1 and 2, for example, the recording/playback apparatus 1 includes an apparatus body 2 shaped like a substantially rectangular box, and is set in a manner such that the direction of the longer side of the apparatus body 2 serves as the width direction and the direction of the shorter side serves as the depth direction. Further, one side surface of the apparatus body 2 where a door opening and closing mechanism 10 is provided serves as a front surface 2a facing the user. A right side surface 2b is provided on the right side of the front surface 2a, a left side surface 2c is provided on the left side of the front surface 2a, and a rear surface 2d is provided on a side opposite the front surface 2a.

Figure 9:
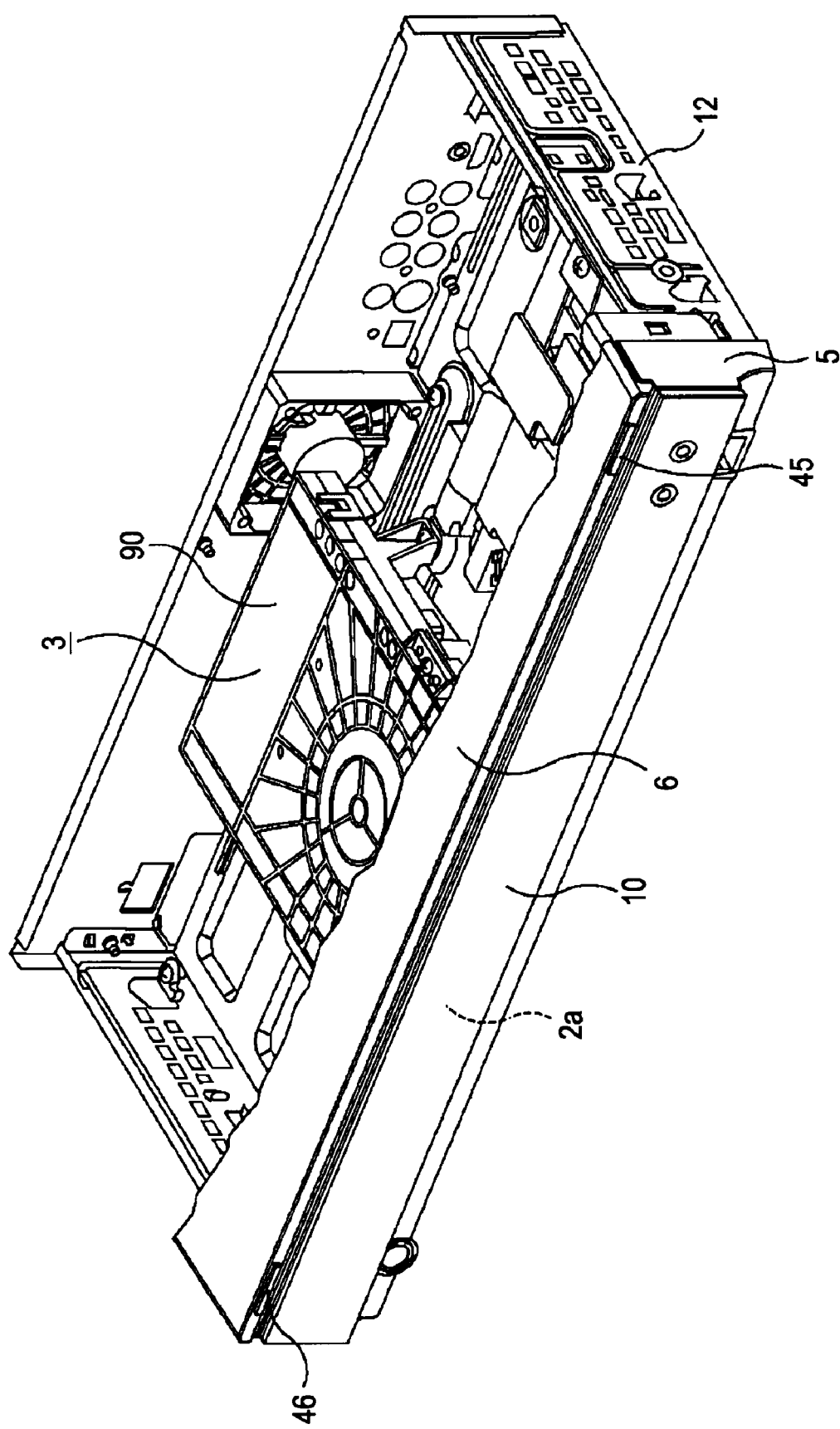
FIG. 9 is a perspective view showing the interior of an apparatus body.

The apparatus body 2 includes therein a disc drive device 3 for performing recording and/or playback of an optical disc, and a chassis 4 shaped like a rectangular box in which various electronic components, such as a CPU and a memory, are mounted (see FIG. 9). The exterior of the apparatus body 2 is defined by a front panel 5, a top plate 6, a right side panel 7, and a left side panel 8 that are attached to the front, upper, right, and left sides of the chassis 4, respectively. As will be described in detail below, the front panel 5 is provided with a door opening and closing mechanism 9 in which a door 10 for opening and closing the front surface 2a of the apparatus body 2 is pivotally supported.

Chassis

Next, the chassis 4 of the apparatus body 2 will be described. The chassis 4 is formed by butt coupling of a pair of upper and lower cases 11 and 12 each of which is punched from a steel plate and folded into the shape of a substantially rectangular box. As shown in FIG. 2, the chassis 4 has, on both sides in the long-side direction, a right mounting wall 15 and a left mounting wall 16 on which the right side panel 7 and the left side panel 8 are attached, respectively. The right mounting wall 15 and the left mounting wall 16 have a plurality of retaining holes 17 in which retaining claws of the right side panel 7 and left side panel 8 are caught.

The right mounting wall 15 and the left mounting wall 16 have engaging portions 18 with which right and left ribs 30 and 31 provided on the top plate 6 are to be engaged. The engaging portions 18 are formed by portions of the right mounting wall 15 and the left mounting wall 16 concaved in the chassis 4, and the ribs 30 and 31 fall in the engaging portions 18 and are engaged therewith from the outer side. The engaging portions 18 have engaging holes 19 with which rib claws 32 and 33 projecting from the ribs 30 and 31 are to be engaged. When the rib claws 32 and 33 are engaged with the engaging holes 19, the chassis 4 and the top plate 6 are positioned on the front side in the short-side direction, and the top plate 6 is prevented from falling off in the up-down direction. The engaging holes 19 are wider than the rib claws 32 and 33 in the short-side direction of the top plate 6. When the rib claws 32 and 33 are engaged with the engaging holes 19, side face portions 32a and 33a of the rib claws 32 and 33 come into contact with side edges of the engaging holes 19 near the front surface 2a, and clearances are formed between the rib claws 32 and 33 and side edges of the engaging holes 19 near the rear surface 2d. The engagement state between the rib claws 32 and 33 and the engaging holes 19 will be described in detail below.

The engaging portions 18 also have hook holes 28 in which hooks 48 of the side panels 7 and 8, which will be described below, are to be inserted. The hook holes 28 are open at positions closer to the rear surface 2d than the engaging holes 19.

A pair of guide groves 26 for guiding sliding of the ribs 30 and 31 of the top plate 6 are provided in the upper surface 4a of the chassis 4 near the engaging portions 18. The guide grooves 26 are formed by drawing, and the width thereof gradually decreases from the front surface 2a toward the rear surface 2d. Further, ends of the guide grooves 26 on the side of the rear surface 2d are connected to the engaging portions 18 of the mounting walls 15 and 16 that are provided on the inner side of the apparatus body 2 in the long-side direction. Therefore, when the top plate 6 is joined to the upper surface 4a of the chassis 4, the ribs 30 and 31 can be guided to the engaging portions 18 by being slid from the front surface 2a toward the rear surface 2d. The ribs 30 and 31 are guided by the guide grooves 26 and fall into the engaging portions 18, so that the rib claws 32 and 33 are engaged with the engaging holes 19.

The upper surface 4a of the chassis 4 to which the top plate 6 is joined is provided with first and second positioning holes 20 and 21 to be engaged with first and second positioning projections 40 and 41 provided on the top plate 6. The first and second positioning holes 20 and 21 are provided at almost the center of the upper surface 4a in the long-side direction, and are spaced from each other in the short-side direction. The first and second positioning holes 20 and 21 are in contact with the first and second positioning projections 40 and 41 of the top plate 6 on both sides in the long-side direction and on the rear side in the short-side direction of the apparatus body 2, thereby positioning the chassis 4 and the top plate 6 on both sides in the long-side direction and on the rear side in the short-direction.

The first and second positioning holes 20 and 21 have rectangular concave portions 22 that are open on the side of the front surface 2a of the apparatus body 2 and are closed on both sides in the long-side direction and on the rear side in the short-side direction, and opening portions 23 connected to the open ends of the rectangular concave portions 22 and having a sufficient width for the first and second positioning projections 40 and 41 to be inserted and taken out therethrough. The rectangular concave portions 22 have almost the same width as that of the first and second positioning projections 40 and 41. When engaged with the first and second positioning projections 40 and 41, the rectangular concave portions 22 clamp both side in the long-side direction of the first and second positioning projections 40 and 41, and thereby position the top plate 6 relative to the chassis 4 in the long-side direction.

The rectangular concave portion 22 of the first positioning hole 20 provided near the front surface 2a of the apparatus body 2 is engaged with the first positioning projection 40, so that an edge thereof near the rear surface 2d is brought into contact with the first positioning projection 40, thereby positioning the top plate 6 relative to the chassis 4 on the rear side in the short-side direction. The rectangular concave portion 22 of the second positioning hole 21 provided near the rear surface 2d of the apparatus body 2 is slightly longer in the short-side direction than the rectangular concave portion 22 of the first positioning hole 20, and a side edge thereof near the rear surface 2d will not be in contact with the second positioning projection 41.

When the top plate 6 is attached from the side of the front surface 2a of the apparatus body 2, the first and second positioning projections 40 and 41 projecting from the top plate 6 are inserted in the opening portions 23 of the first and second positioning holes 20, and are engaged with the rectangular concave portions 22 by sliding of the top plate 6 toward the rear side of the apparatus body 2.

The upper surface 4a of the chassis 4 also has a plurality of retaining openings 25 in which retaining pieces 42 provided on the top plate 6 are caught. When the top plate 6 is attached to the chassis 4, the retaining pieces 42 of the top plate 6 are engaged with the retaining openings 25 from the side of the front surface 2a of the apparatus body 2, whereby the top plate 6 is prevented from falling off the chassis 4.

Top Plate

Figure 3:
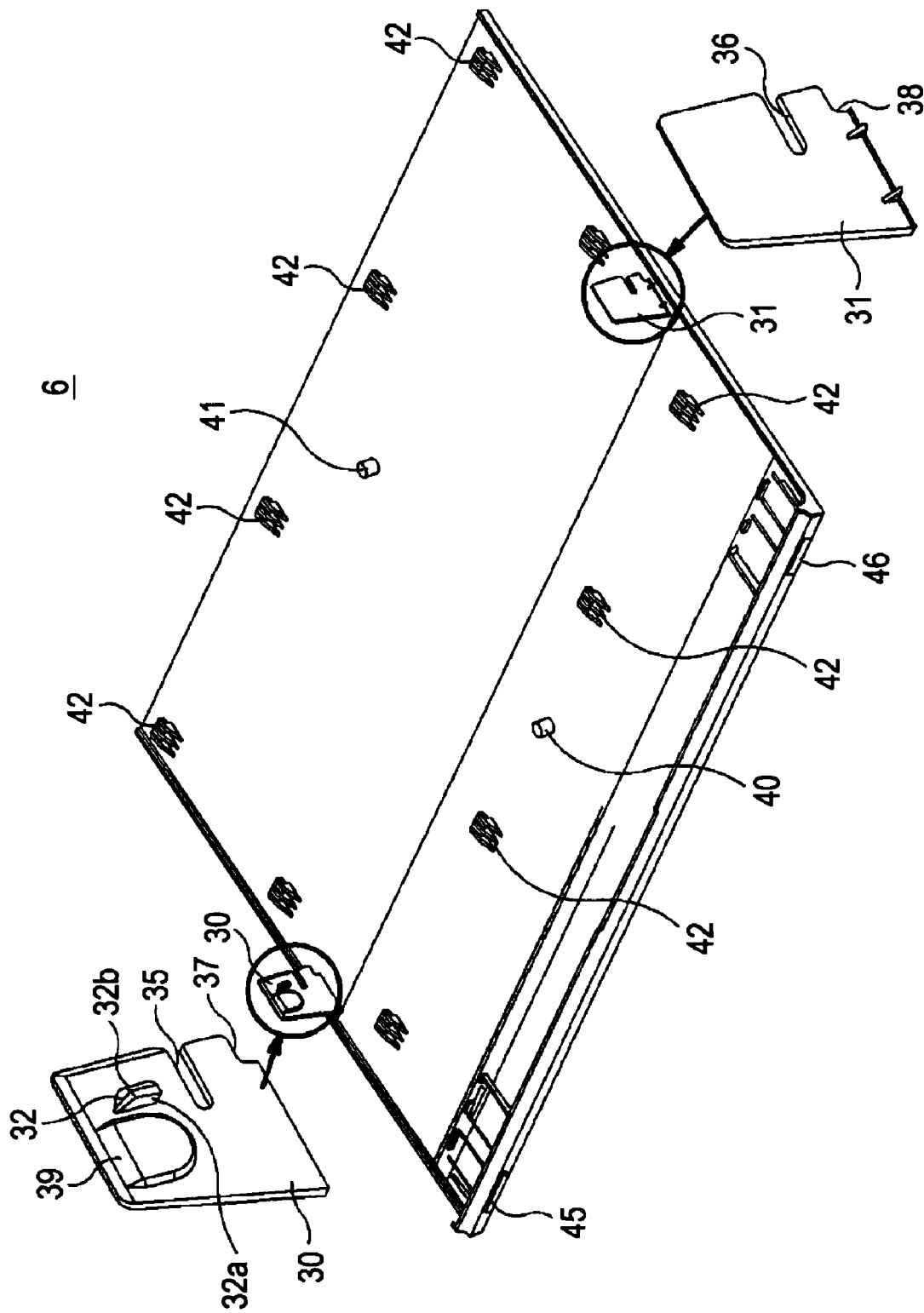
FIG. 3 is a back-side perspective view of a top plate.

Next, a description will be given of the top plate 6 to be attached to the upper surface 4a of the chassis 4. As shown in FIGS. 2 and 3, the top plate 6 is shaped like a flat plate having almost the same size as that of the upper surface 4a of the chassis 4, and is molded from a material different from the material of the chassis 4, for example, synthetic resin. After formed by molding, the top plate 6 is subjected to, for example, mirror finishing so as to improve the outer appearance.

The right rib 30 and the left rib 31 are provided on both sides in the long-side direction and at almost the center in the short-side direction of the top plate 6. The right rib 30 and the left rib 31 are engaged with the engaging portions 18 of the right mounting wall 15 ad the left mounting wall 16 of the chassis 4. From a side surface of the right rib 30 facing the right mounting wall 15 of the chassis 4, a rib claw 32 projects to be engaged with the engaging hole 19. Further, from a side surface of the left rib 31 facing the left mounting wall 16 of the chassis 4, a rib claw 33 projects to be engaged with the engaging hole 19. By engagement with the engaging holes 19, the rib claws 32 and 33 position the top plate 6 relative to the chassis 4 on the front side in the short-side direction and prevent the top plate 6 from falling off in the up-down direction. The rib claws 32 and 33 respectively have side face portions 32a and 33a and tapered face portions 32b and 33b. The side face portions 32a and 33a are provided on the front side of the apparatus body 2 in the short-side direction, in a manner such as to nearly oppose the front surface 2a of the apparatus body 2. The tapered face portions 32b and 33b are provided near the rear surface 2d of the apparatus body 2 in a manner such as to be slidable toward the rear side in the short-side direction.

Figure 4:
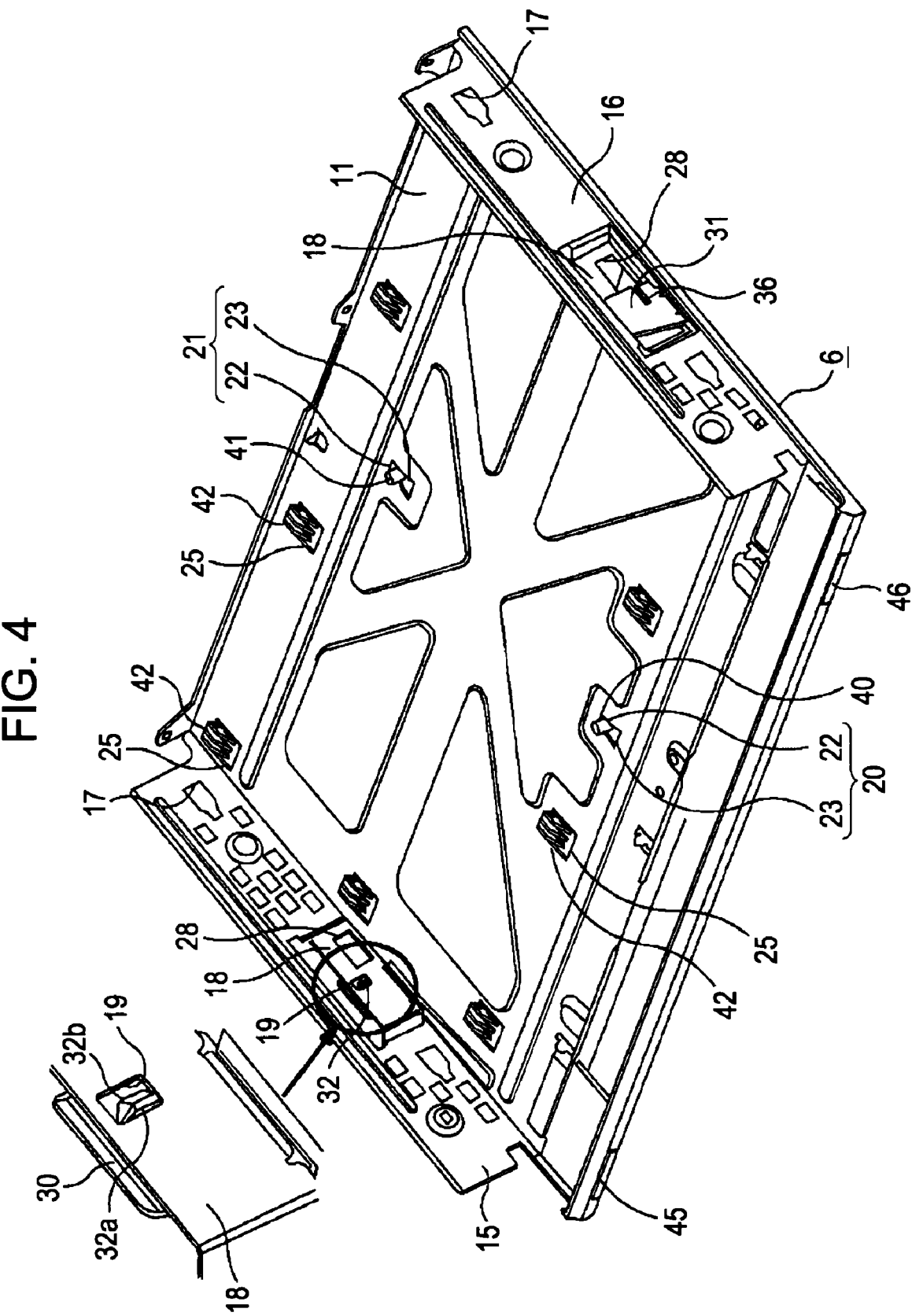
FIG. 4 is a back-side perspective view of an upper surface of a chassis to which the top plate is joined.

When the top plate 6 is attached to the chassis 4 from the side of the front surface 2a of the apparatus body 2, the tapered face portions 32b and 33b of the rib claws 32 and 33 slide in the engaging portions 18 of the mounting walls 15 and 16, and are inserted in and engaged with the engaging holes 19. In this case, as shown in FIGS. 4 and 6, when the rib claws 32 and 33 are engaged with the engaging holes 19, the side face portions 32a and 33a opposing the front surface 2a of the apparatus body 2 come into contact with one-side edges of the engaging holes 19. Further, end faces of the rib claws 32 and 33 near the upper surface of the top plate 6 oppose the other-side edges of the engaging holes 19. By contact of the side face portions 32a and 33a of the rib claws 32 and 33 with the one-side edges of the engaging holes 19, the chassis 4 and the top plate 6 are positioned on the front side in the short-side direction. Moreover, since the end faces of the rib claws 32 and 33 oppose the other-side edges of the engaging holes 19, the top plate 6 is prevented from falling off in the up-down direction.

The rib claws 32 and 33 have a height such as not to fall off from the engaging holes 19 even when the top plate 6 is bent outward in the long-side direction by distortion resulting from the difference in coefficient of linear expansion between the top plate 6 and the chassis 4. For example, the height of the rib claws 32 and 33 is 1.4 mm.

As shown in FIG. 3, the ribs 30 and 31 respectively have slits 35 and 36 near base ends thereof close to the top plate 6. The slits 35 and 36 provide flexibility that allows the ribs 30 and 31 to be bent outward in the long-side direction. When the top plate 6 is bent outward in the long-side direction at the base ends of the slits 35 and 36, the rib claws 32 and 33 are disengaged from the engaging holes 19, so that the top plate 6 can be detached from the chassis 4.

Figure 7:
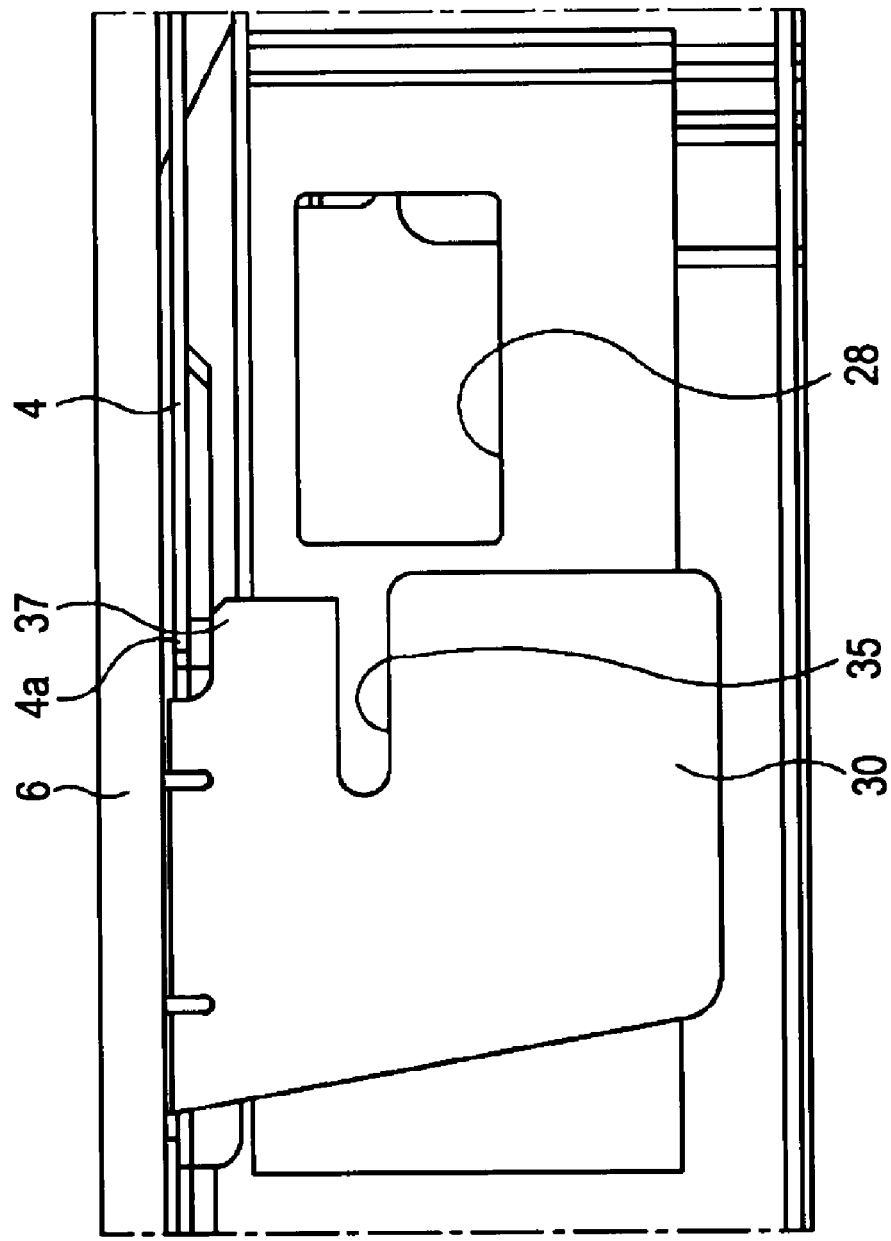
FIG. 7 is a sectional side view showing the joint state between the top plate and the chassis.

The ribs 30 and 31 also respectively have cutouts 37 and 38 provided at positions closer to the top plate 6 than the slits 35 and 36 in a manner such as to extend from the rear surface 2d of the apparatus body 2 toward the front surface 2a. As shown in FIG. 7, when the top plate 6 is attached to the chassis 4, the cutouts 37 and 38 are caught in the upper surface 4a of the chassis 4 near the engaging portions 18, thereby preventing the top plate 6 from falling off in the up-down direction.

As shown in FIG. 3, the ribs 30 and 31 also have tapered portions 39 at leading ends in the standing direction. The tapered portions 39 slide on the mounting walls 15 and 16 when the ribs 30 and 31 are engaged with the engaging portions 18. The tapered portions 39 fall down while sliding on the mounting walls 15 and 16, and the rib claws 32 and 33 can be inserted in and engaged with the engaging holes 19. Thus, the ribs 30 and 31 can be smoothly engaged with the engaging portions 18.

The first and second positioning projections 40 and 41 to be engaged with the first and second positioning holes 20 and 21 provided in the upper surface 4a of the chassis 4 project from the back surface of the top plate 6. The first and second positioning projections 40 and 41 are each shaped like a cylindrical column, project at almost the center in the long-side direction of the top plate 6, and are spaced from each other in the short-side direction. As shown in FIG. 4, the first positioning projection 40 projecting near the front surface 2a of the apparatus body 2 is engaged with the first positioning hole 20 provided near the front surface of the chassis 4. Further, the second positioning projection 41 projecting near the rear surface 2d of the apparatus body 2 is engaged with the second positioning hole 21 provided near the back surface of the chassis 4.

In addition, the back surface of the top plate 6 has a plurality of retaining pieces 42 projecting to be caught in retaining openings 25 provided in the upper surface 4a of the chassis 4. The retaining pieces 42 are scattered over the entire surface of the top plate 6 corresponding to the retaining openings 25. Also, the retaining pieces 42 are nearly shaped like hooks that stand from the back surface of the top plate 6 and that have leading portions hanging toward the rear surface 2d of the apparatus body 2. When the top plate 6 is attached to the upper surface 4a of the chassis 4 from the side of the front surface 2a, as shown in FIG. 4, the hook-shaped leading ends of the retaining pieces 42 are inserted in the chassis 4 through the retaining openings 25 and are caught by side edges of the retaining openings 25, whereby the retaining pieces 42 can prevent the top plate 6 from falling off in the up-down direction as the cutouts 37 and 38 of the ribs 30 and 31 do.

An eject button 45 and a power button 46 are provided on a side surface of the top plate 6 at the front surface 2a of the apparatus body 2. The eject button 45 and the power button 46 are spaced from each other in the long-side direction. The eject button 45 allows a disc tray 91 of the disc drive device 3 to slide into or out of the apparatus body 2. The power button 46 powers the recording/playback apparatus 1 on and off.

2. Mounting Method for Top Plate

Figure 5A:
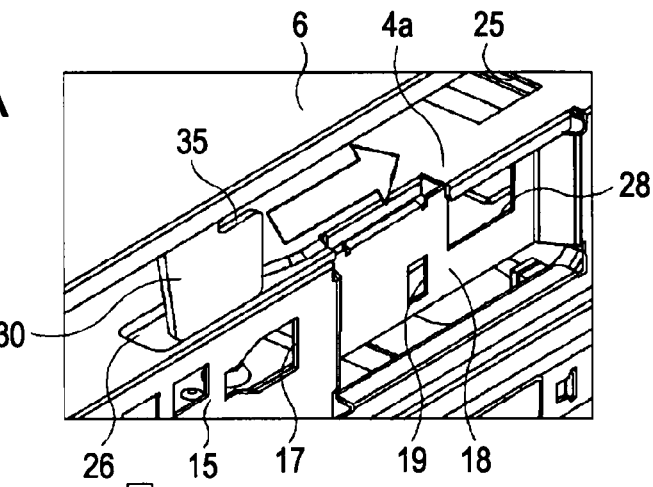
FIGS. 5A to 5D are perspective views showing a process for attaching the top plate to the chassis.

Next, mounting of the top plate 6 to the chassis 4 will be described. In the recording/playback apparatus 1, after the front panel 5 supporting the door 10 is attached to the chassis 4 defined by butt coupling of the upper and lower cases 11 and 12, the top plate 6 is attached to the chassis 4. As shown in FIG. 5A, first, the ribs 30 and 31 of the top plate 6 are slid in the guide grooves 26 provided on the upper surface 4a of the chassis 4 from the front surface 2a of the chassis 4. Since the width of the guide grooves 26 decreases toward the rear surface 2d, the ribs 30 and 31 of the top plate 6 are reliably guided to the engaging portions 18.

Figure 5B:
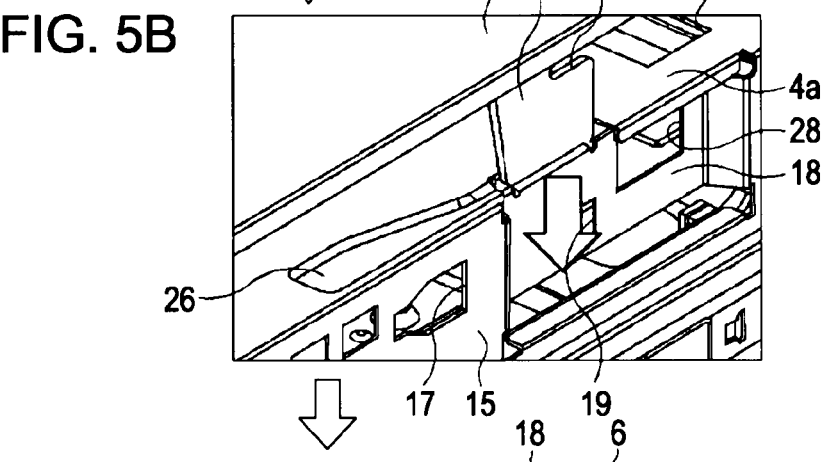

Since the engaging portions 18 are defined by the concave portions of the right mounting wall 15 and the left mounting wall 16, when the ribs 30 and 31 are slid to ends of the guide grooves 26 close to the rear surface 2d, they fall in the engaging portions 18, as shown in FIG. 5B. In this case, the tapered portions 39 at the leading ends in the standing direction of the ribs 30 and 31 slide on the engaging portions 18. Since the ribs 30 and 31 can be bent outward in the long-side direction because of the slits 35 and 36, they can smoothly fall into the engaging portions 18.

When the ribs 30 and 31 fall into the engaging portions 18, the first and second positioning projections 40 and 41 of the top plate 6 are inserted in the opening portions 23 of the first and second positioning holes 20 and 21 provided in the upper surface 4a of the chassis 4. Also, the hook-shaped leading ends of the retaining pieces 42 of the top plate 6 are inserted in the retaining openings 25 provided in the upper surface 4a of the chassis 4. Further, by the force of the ribs 30 and 31 falling in the engaging portions 18 for elastically returning inward in the long-side direction, the rib claws 32 and 33 slide down on the engaging portions 18 to the same height as that of the engaging holes 19.

Figure 5C:
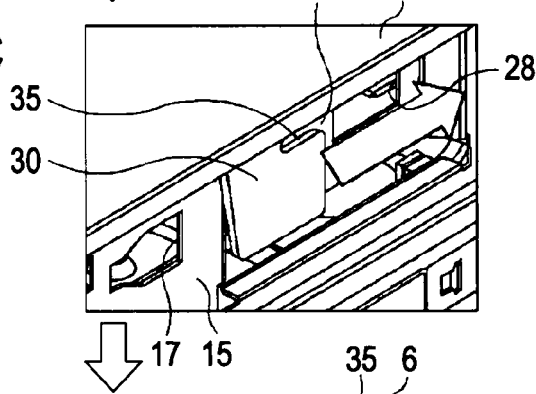

As shown in FIG. 5C, when the top plate 6 is slid toward the rear surface 2d, the rib claws 32 and 33 are engaged with the engaging holes 19. In this case, since the rib claws 32 and 33 have the tapered face portions 32b and 33b on the side of the rear surface 2d, the top plate 6 can be smoothly slid toward the rear surface 2d. When the rib claws 32 and 33 are engaged with the engaging holes 19, as shown in FIG. 6, the side face portions 32a and 33a provided on the side of the front surface 2a come into contact with the one-side edges of the engaging holes 19 on the side of the front surface 2a. This contact positions the top plate 6 relative to the chassis 4 on the front side in the short-side direction and restricts the movement of the top plate 6 toward the front side in the short-side direction.

When the top plate 6 is slid toward the rear surface 2d, the first and second positioning projections 40 and 41 are engaged with the rectangular concave portions 22 of the first and second positioning holes 20 and 21. The rectangular concave portions 22 have almost the same width in the long-side direction as that of the first and second positioning projections 40 and 41. Hence, when the rectangular concave portions 22 are engaged with the first and second positioning projections 40 and 41, they clamp both sides in the long-side direction of the first and second positioning projections 40 and 41 so as to position the top plate 6 relative to the chassis 4 in the long-side direction and to restrict the movement of the top plate 6 in the long-side direction.

Since the first positioning projection 40 comes into contact with the edge of the rectangular concave portion 22 of the first positioning hole 20 on the side of the rear surface 2d, the top plate 6 is positioned relative to the chassis 4 on the rear side in the short-side direction, and the movement of the top plate 6 toward the rear side in the short-side direction is restricted.

By the engagement of the first positioning projection 40 with the rectangular concave portion 22 of the first positioning hole 20 at almost the center in the long-side direction, both sides in the long-side direction of the first positioning projection 40 are clamped by the rectangular concave portion 22, so that the top plate 6 is positioned in the long-side direction. In the top plate 6, the ribs 30 and 31 are flexible in the long-side direction, and the rib claws 32 and 33 are engaged with the engaging holes 19 from the outer side in the long-side direction. Therefore, even when the top plate 6 formed of the material having a coefficient of linear expansion higher than that of the chassis 4 expands, the expansion in the long-side direction is not restricted, and the top plate 6 can be prevented from being distorted by the internal stress.

In other words, in the apparatus body 2, the top plate 6 may expand or contract because of the change of the installation environment, for example, a rapid change in room temperature. Since expansion or contraction easily occurs on both sides in the long-side direction of the substantially rectangular top plate 6, if the top plate 6 is firmly fastened at both sides in the long-side direction to the mounting walls 15 and 16 of the chassis 4, for example, by screwing, the stress of expansion or contraction is not released, and this appears as distortion of the top plate 6. Moreover, the screwed portions may be whitened or broken. When the top plate 6 is subjected to mirror finishing, distortion of the top plate 6 remarkably appears as distortion of a reflection image, and this seriously impairs the appearance.

In contrast, the ribs 30 and 31 provided on both sides in the long-side direction of the top plate 6 are flexible in the long-side direction, and the rib claws 32 and 33 are engaged with the engaging holes 19 from the outer side in the long-side direction. Therefore, even when expansion or contraction occurs on both sides in the long-side direction, stress can be released, and the top plate 6 is not distorted. Further, since screws are not used, the problems of whitening or breakage of the screwed portions will not occur. In addition, since the first positioning projection 40 is engaged with the rectangular concave portion 22 of the first positioning hole 20 at almost the center in the long-side direction of top plate 6, the position of the top plate 6 in the long-side direction is restricted. Hence, both sides in the long-side direction of the top plate 6 are equally changed by expansion or contraction resulting from the change in temperature of the installation environment. For this reason, the outer appearance is not impaired. Moreover, the projecting heights of the rib claws 32 and 33 from the engaging holes 19 in accordance with the amounts of change on both sides in the long-side direction can be made equal and minimized.

Since the first positioning projection 40 is engaged with the rectangular concave portion 22 of the first positioning hole 20 near the front surface 2a in the short-side direction, the rear side in the short-side direction of the first positioning projection 30 is in contact with the rectangular concave portion 22. Further, the side face portions 32a and 33a of the rib claws 32 and 33 are in contact with the one-side edges of the engaging holes 19 on the side of the front surface 2a. Hence, the top plate 6 is positioned in the short-side direction.

The position where the first positioning projection 40 on the rear side in the short-side direction is restricted by the first positioning hole 20 and the positions where the side face portions 32a and 33a of the rib claws 32 and 33 on the front side in the short-side direction are restricted by the one-side edges of the engaging holes 19 on the side of the front surface 2a are close to each other in the short-side direction. Hence, the restricting positions are rarely changed in the short-side direction by expansion or contraction due to the temperature change. Further, the edge of the rectangular concave portion 22 of the first positioning hole 20 on the side of the rear surface 2d is in contact with the first positioning projection 40, and the edge of the rectangular concave portion 22 near the front surface 2a is opened by the opening portion 23. The one-side edges of the engaging holes 19 on the side of the front surface 2a are in contact with the side face portions 32a and 33a of the rib claws 32 and 33, and clearances are provided between the other-side edges of the engaging holes 19 on the side of the rear surface 2d and the tapered face portions 32b and 33b. Therefore, even when the top plate 6 expands, expansion in the short-side direction is not restricted, and the top plate 6 is prevented from being distorted by restriction of the stress.

The positions of the top plate 6 and the chassis 4 may be restricted by the first positioning projection 40 and the first positioning hole 20 without forming the second positioning projection 41 and the second positioning hole 21. In this case, the top plate 6 and the chassis 4 are positioned at almost the center in the long-side direction near the rear surface 2d in the short-side direction, and are positioned on both sides in the long-side direction near the front surface 2a in the short-side direction. This allows the mounting position of the top plate 6 to be restricted reliably. Further, in this case, misalignment between the second positioning projection 41 and the second positioning holes 21 due to design dimension errors and distortion of the top plate 6 due to the misalignment do not occur between the top plate 6 and the chassis 4.

Figure 5D:
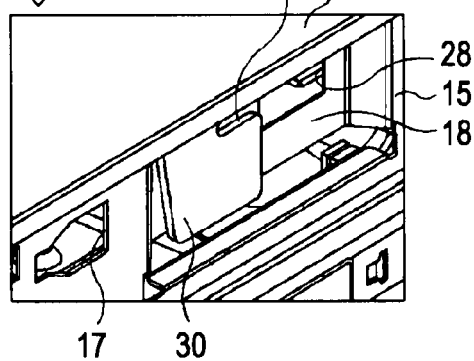

As shown in FIG. 5D, when the top plate 6 is slid toward the rear surface 2d and the rib claws 32 and 33 are engaged with the engaging holes 19, upper side surfaces of the rib claws 32 and 33 come into contact with the upper side edges of the engaging holes 19, so that the top plate 6 is prevented from falling off in the upward direction. Also, the cutouts 37 and 38 provided in the ribs 30 and 31 of the top plate 6 are caught by the ends of the upper surface 4a of the chassis 4, as show in FIG. 7. This also prevents the top plate 6 from falling off in the upward direction as the rib claws 32 and 33 do.

Subsequently to coupling of the top plate 6 to the chassis 4, the right side panel 7 and the left side panel 8 are respectively attached to the right mounting wall 15 and the left mounting wall 16 by being screwed to the rear surface of the chassis 4. As shown in FIG. 1, the right side panel 7 and the left side panel 8 are exterior components having almost the same size as that of the right mounting wall 15 and the left mounting wall 16. From inner side surfaces of the right side panel 7 and the left side panel 8 to be attached to the mounting walls 15 and 16, a plurality of retaining claws (not shown) project to be caught in the retaining holes 17. The retaining claws are inserted in the retaining holes 17 and the hook-shaped leading ends thereof are retained by the mounting walls 15 and 16, so that the right side panel 7 and the left side panel 8 are attached to the chassis 4.

From the inner side surfaces of the right side panel 7 and the left side panel 8, hooks 48 project to be inserted in hook holes 28 provided in the engaging portions 18 of the right and left mounting walls 15 and 16. As show in FIG. 8, hook-shaped leading ends of the hooks 48 are bent toward the front surface 2a and are inserted into the chassis 4 through the hook holes 28 so as to support the engaging portions 18 from the interior of the chassis 4.

Figure 8:
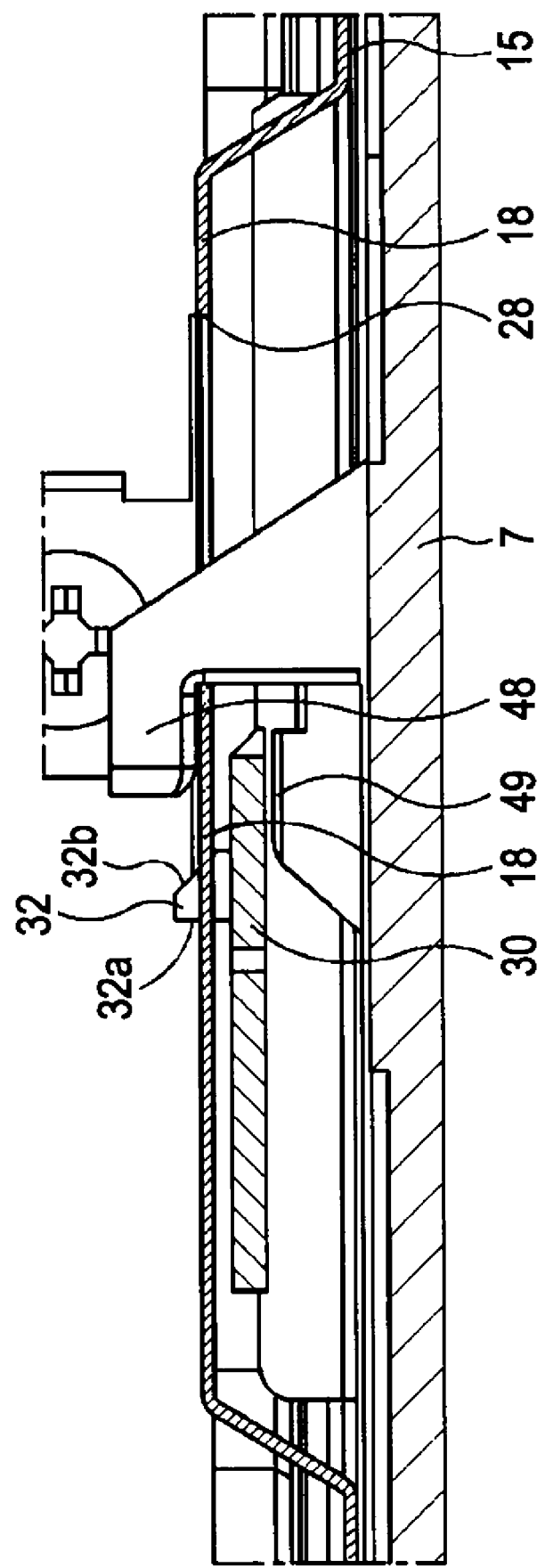
FIG. 8 is a sectional top view showing the joint state between the top plate and the chassis.

The right side panel 7 and the left side panel 8 also have support projections 49 provided near the base ends of the hooks 48 so as to support the ribs 30 and 31 of the top plate 6. As shown in FIG. 8, when the right side panel 7 and the left side panel 8 are attached to the mounting walls 15 and 16, the support projections 49 support the ribs 30 and 31 from the outer sides.

The hooks 48 and the support projections 49 prevent the ribs 30 and 31 of the top plate 6 from falling off, but do not firmly clamp the engaging portions 18 and the ribs 30 and 31 by contact therewith. Therefore, even when the ribs 30 and 31 are supported by the hooks 48 and the support projections 49, they remain flexible outward in the long-side direction, and can release stress resulting from expansion or contraction.

While the top plate 6 is provided with the first positioning projection 40 and the second positioning projection 41 and the chassis 4 is provided with the first positioning hole 20 and the second positioning hole 21 in the recording/playback apparatus 1, first and second positioning projections may be provided on the upper surface 4a of the chassis 4 and first and second positioning recesses with which the first and second positioning projections are to be engaged may be provided on the back surface of the top plate 6.

Further, while the top plate 6 is attached to the upper surface 4a of the chassis 4 by being slid from the front surface 2a, it may be attached by being slid from the rear surface 2d toward the front surface 2a. In this case, the orientations of the rectangular concave portions 22 and the opening portions 23 of the first and second positioning holes 20 and 21 are made opposite the orientations adopted in the embodiment. This also applies to the guide grooves 26.

While the rib claws 32 and 33 project from the ribs 30 and 31 of the top plate 6 and the engaging holes 19 are provided in the engaging portions 18 of the mounting walls 15 and 16 of the chassis 4 in the recording/playback apparatus 1, conversely, engaging holes may be provided in the ribs 30 and 31 of the top plate 6 and engaging projections to be engaged with the engaging holes may be provided in the engaging portions 18 of the mounting walls 15 and 16.

While the ribs 30 and 31 of the top plate 6 are made flexible by the slits 35 and 36, they may be made flexible by reducing the thickness of the base ends of the ribs.

3. Door Opening and Closing Mechanism

Front Panel

Figure 10:
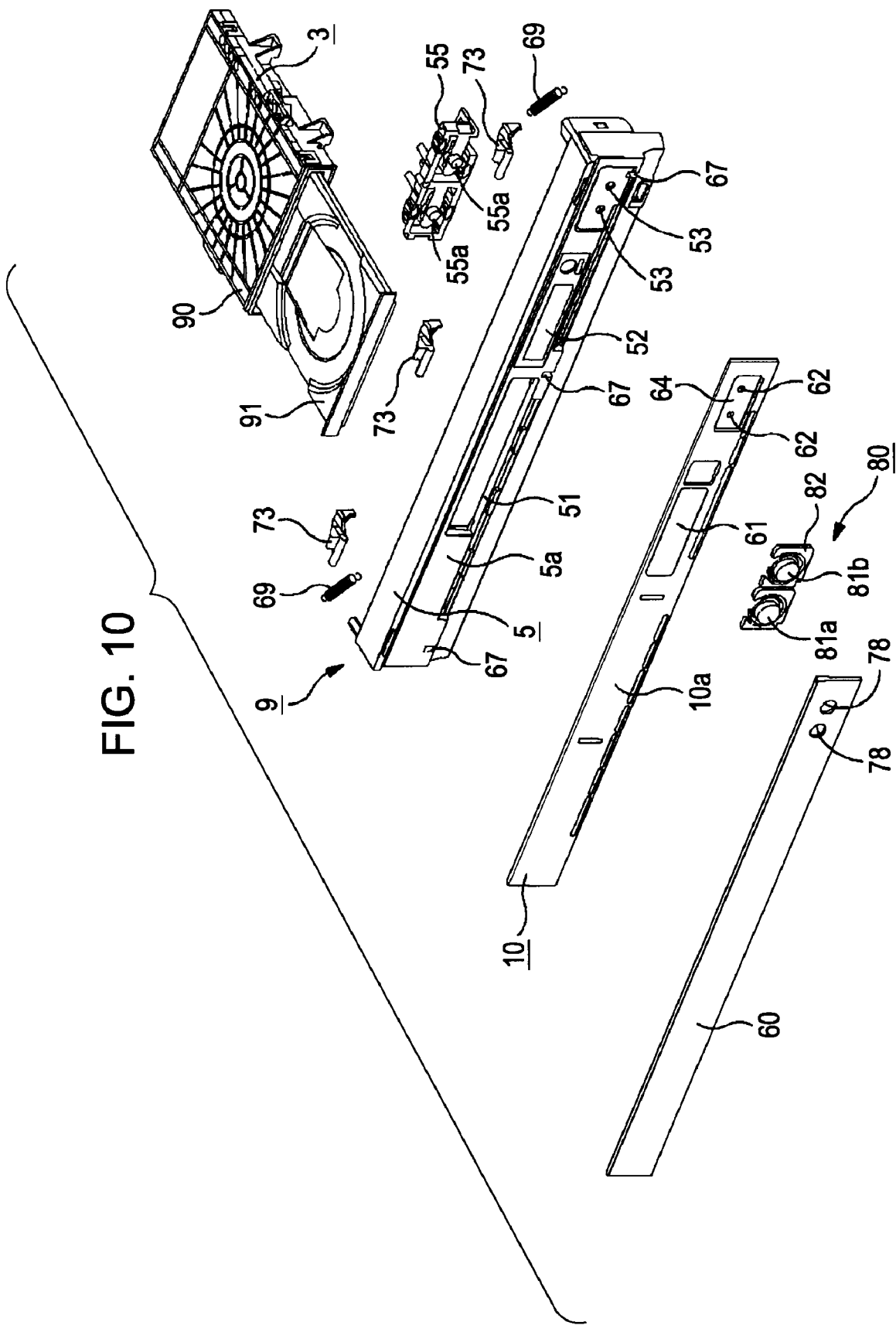
FIG. 10 is an exploded perspective view of a front panel, a disk drive device, and a door opening and closing mechanism.
Figure 11:
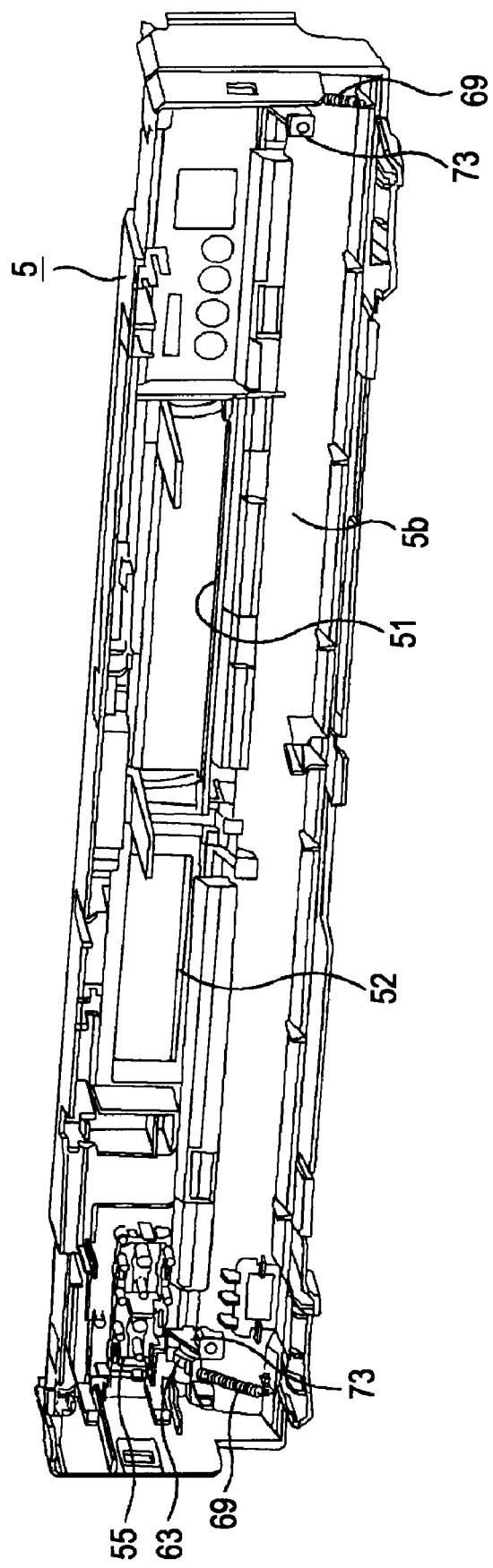
FIG. 11 is a back-side perspective view of the front panel.

Next, a description will be given of the cover opening and closing mechanism 9 for opening and closing the front surface 2a of the apparatus body 2. First, a description will be given of the front panel 5 that is attached to the front surface 2a of the chassis 4 and that is provided with the door opening and closing mechanism 9. As shown in FIGS. 9 to 11, the front panel 5 is shaped like a substantially rectangular box, and has a length in the long-side direction and a height that are substantially equal to those of the chassis 4. A main surface portion 5a that forms the front surface 2a of the apparatus body 2 includes a tray insertion slit 51 through which the disc tray 91 of the disc drive device 3 is inserted, a display portion 52 for displaying, for example, an operating condition and contents information, and operation holes 53 which pushbuttons 55 (55a and 55b) face from behind and in which a control button 80 is inserted.

The tray insertion slit 51 is provided at almost the center of the main surface portion 5a of the front panel 5, and has a sufficient size for the disc tray 91 to be inserted therethrough. At the display portion 52, a protective film or a transparent plate is stuck on a surface of the main surface portion 5a.

For example, the operation holes 53 are juxtaposed at one end of the main surface portion 5a in the long-side direction. At the positions shifted back from the surface of the main surface portion 5a, upper surfaces 55a of the pushbuttons 55 face the operation holes 53. The operation holes 53 are too small for the user's finger to be put therein so that the pushbuttons 55 are not pushed from the outside.

The door opening and closing mechanism 9 provided in the front panel 5 includes the door 10 that opens or closes the main surface portion 5a of the front panel 5, control switches 56 provided close to the rear side of the apparatus body 2 to be pushed by the pushbuttons 55 so as to start and stop reproduction of information signals recorded on an optical disc, and a control button 80 provided in the door 10 so as to operate the control switches 56 via the pushbuttons 55.

Figure 19:
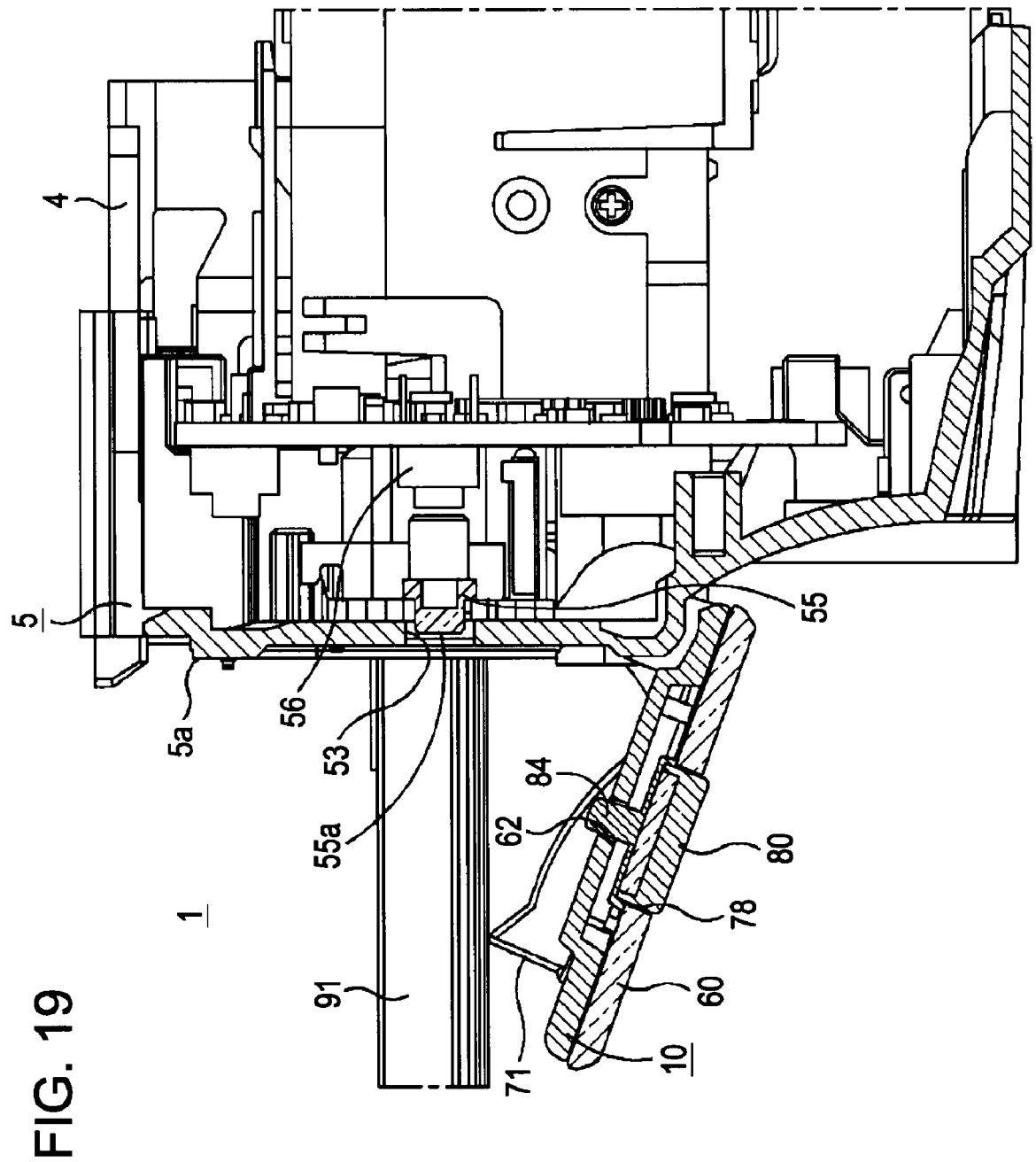
FIG. 19 is a cross-sectional view of a recording/playback apparatus in which a door is turned to an open position of a front surface of an apparatus body.
Figure 20:
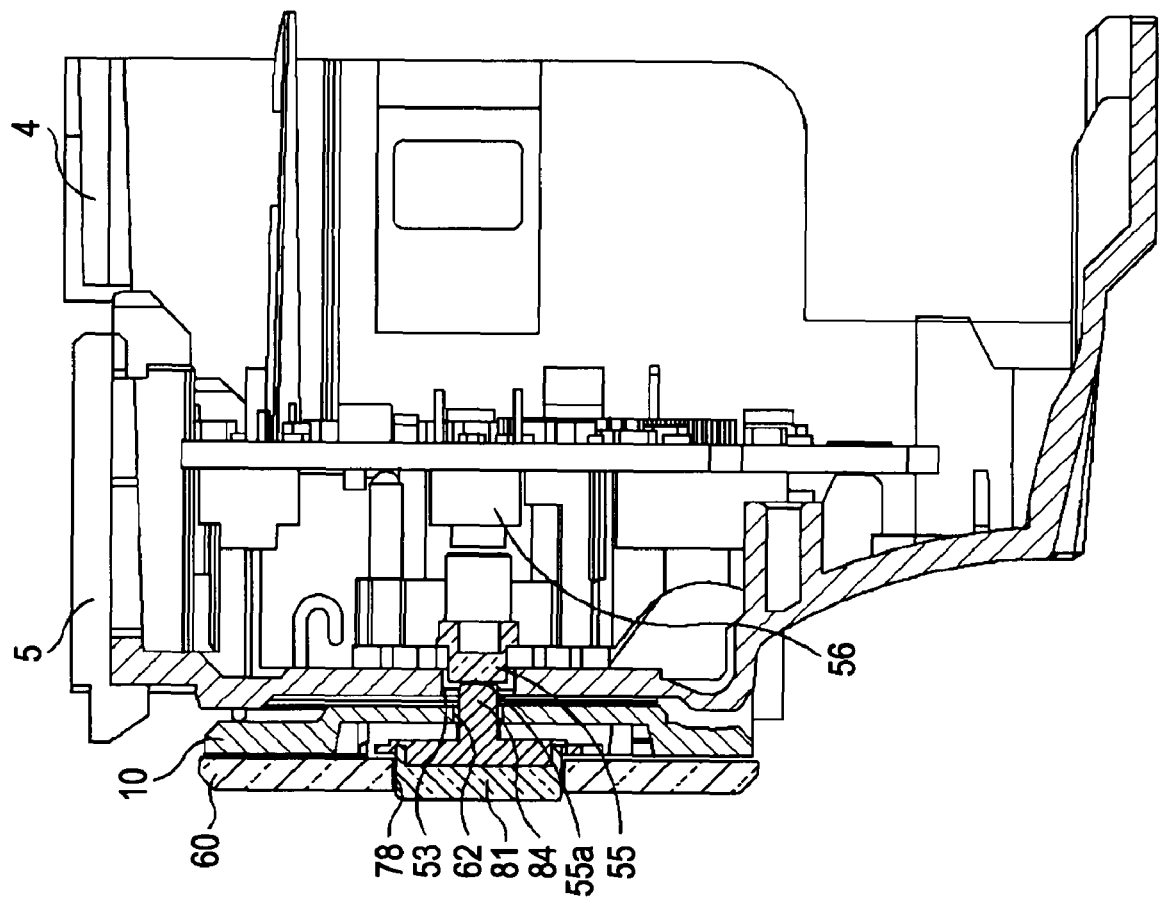
FIG. 20 is a cross-sectional view of the recording/playback apparatus in which the door is turned to a close position of the front surface of the apparatus body.

In the door opening and closing mechanism 9, the pushbuttons 55 are attached to a back surface 5b of the front panel 5, and the control switches 56 are provided behind the pushbuttons 55 (see FIGS. 19 and 20). When the control button 80 is pressed in a state in which the door 10 is in tight contact with the main surface portion 5a of the front panel 5 and is placed at a close position to close the front surface 2a of the apparatus body 2, the control switch 56 is pushed via the pushbutton 55. Further, when the door 10 is separated from the main surface portion 5a of the front panel 5 and is placed at an opening position to open the front surface 2a of the apparatus body 2, operation of the control switch 56 via the pushbutton 55 is disabled, and playback of the optical disc is prohibited.

Door

The door 10 is pivotally supported by the main surface portion 5a of the front panel 5. By closing the front surface 2a of the apparatus body 2, the door 10 closes the tray insertion slit 51 provided in the front panel 5, prevents dust and the like from entering the apparatus body 2, and prevents the driving sound of the disc drive device 3 from leaking out. A transparent plate 60 is stuck on a surface 10a of the door 10 that is identical to the front surface 2a of the apparatus body 2.

Figure 13:
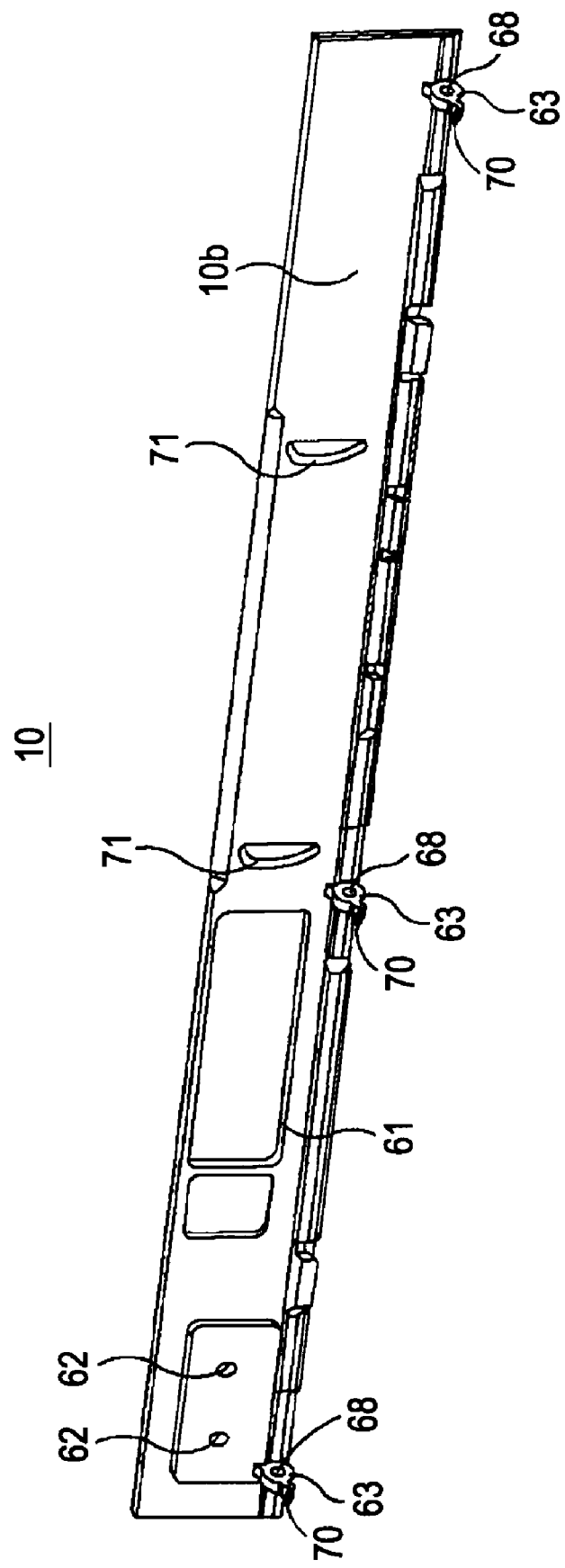
FIG. 13 is a back-side perspective view of the door.
Figure 16:
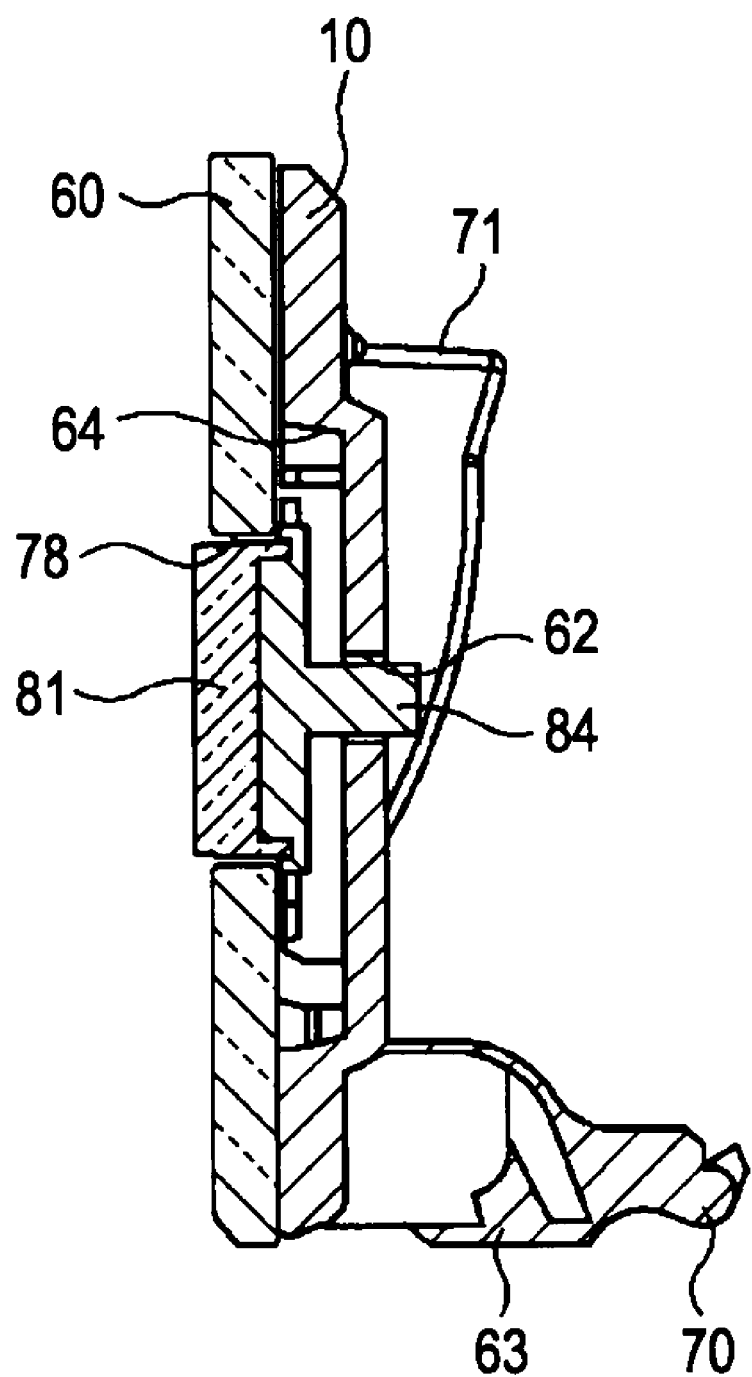
FIG. 16 is a cross-sectional view showing a state in which the control button is clamped by the door and a transparent plate.

The door 10 is shaped like a rectangular plate having almost the same size as that of the main surface portion 5a of the front panel 5, and includes a display window 61 corresponding to the display portion 52, and insertion holes 62 corresponding to the operation holes 53 (see FIG. 16). Operating projections 84 of the control button 80 are fitted in the insertion holes 62. As shown in FIG. 13, pivot support pieces 63 are provided on a back surface 10b of the door 10 facing the main surface portion 5a of the front panel 5, and a concave face portion 64 in which the control button 80 is arranged is provided on the front surface 10a of the door 10.

Figure 12A:
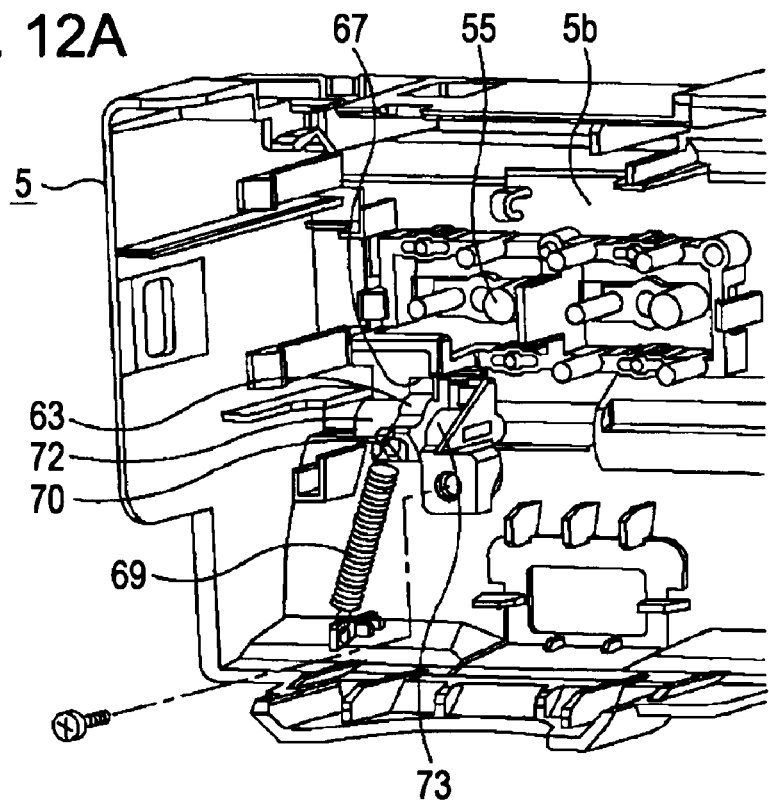
FIGS. 12A and 12B are perspective views showing a support state of a door and the front panel.
Figure 12B:
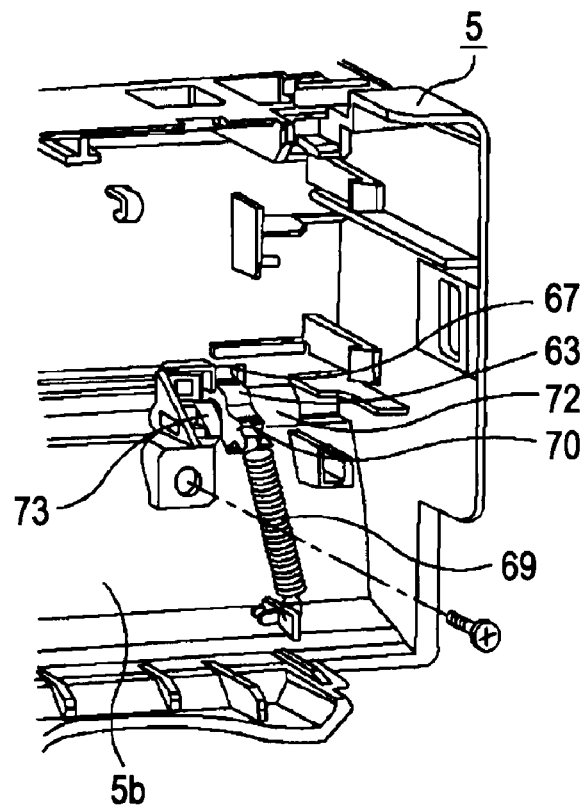

As shown in FIG. 13, the pivot support pieces 63 are provided at a lower edge of the door 10 and at a plurality of positions in the long-side direction, for example, at three positions, that is, on both sides and at almost the center in the long-side direction. The pivot support pieces 63 include bearing holes 68 to be fitted in insertion openings 67 provided in the lower portion of the main surface portion 5a of the front panel 5, and spring retaining portions 70 by which coil springs 69 for turning and urging the door 10 in the closing direction of the front surface 2a are caught at one end. As shown in FIGS. 12A and 12B, when the pivot support pieces 63 are inserted in the insertion openings 57 of the front panel 5, bearing portions 72 provided on the back surface 5b of the front panel 5 and the bearing holes 68 are connected and are pivotally supported by pivot shafts 73, so that the door 10 is supported pivotally.

Figure 14A:
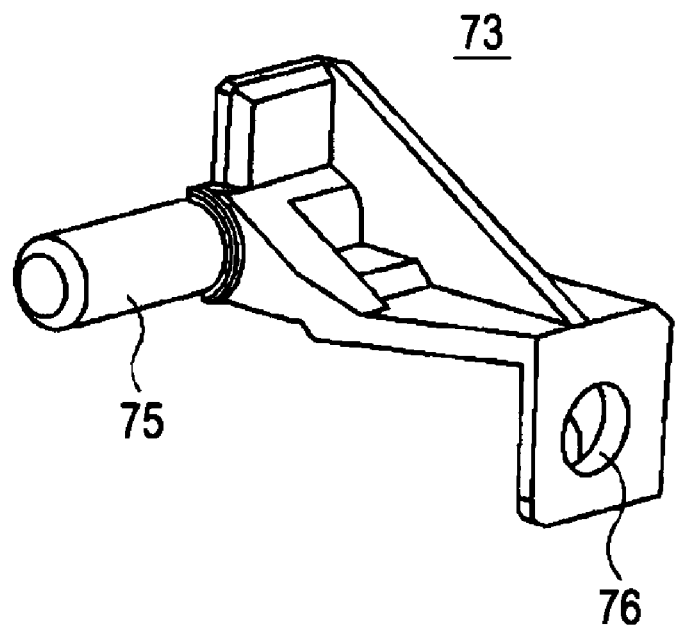
FIGS. 14A and 14B are perspective views of pivot shafts.
Figure 14B:
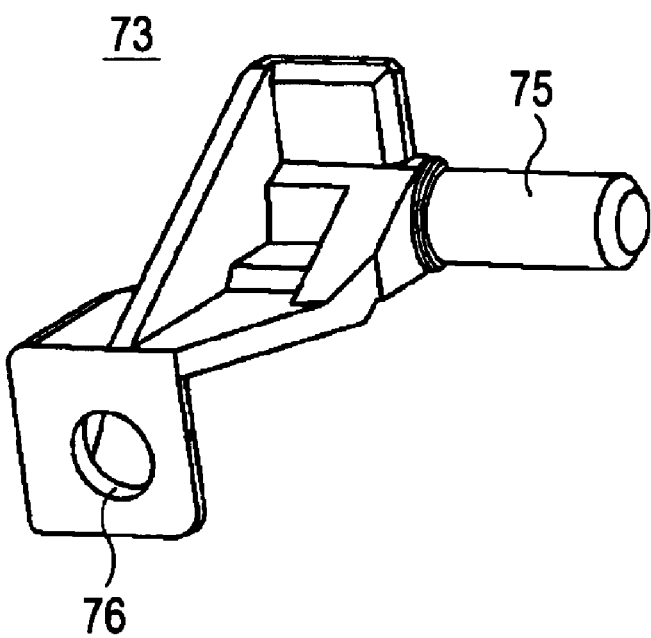

As shown in FIGS. 14A and 14B, the pivot shafts 73 include support shafts 75 to be inserted in the bearing holes 68 of the pivot support pieces 63 and the bearing portions 72 of the front panel 5, and screw hole portions 76 to be screwed to the back surface 5b of the front panel 5. When the pivot support pieces 63 are inserted in the insertion openings 67, the support shafts 75 are inserted in the bearing holes 68 and the bearing portions 72, and the screw hole portions 76 are screwed to screw holes provided in the back surface 5b of the front panel 5. With this, the pivot shafts 73 are fixed to the back surface 5b of the front panel 5, and the support shafts 75 support the door 10 so that the door 10 can pivot toward the main surface portion 5a of the front panel 5. FIG. 14A shows the pivot shaft 73 used near the right side surface 2b, and FIG. 14B shows the pivot shafts 73 used at almost the center and near the left side surface 2c.

In the door 10 supported by the pivot shafts 73, the coil springs 69 are retained at one end by the spring retaining portions 70 of the pivot support pieces 63. The coil springs 69 are retained at the other end by the bottom of the back surface 5b of the front panel 5, and urge the pivot support pieces 63 downward. By the urging force of the coil springs 69, the door 10 is turned and urged in the direction to close the main surface portion 5a of the front panel 5, that is, the front surface 2a of the apparatus body 2.

The back surface 10b of the door 10 is also provided with tray slide pieces 71 which are to be pressed by the disc tray 91 sliding thereon. A plurality of tray slide pieces 71 project in a manner such as to be spaced from each other in the width direction of the door 10. When the disc tray 91 is slid into and out of the apparatus body 2 along the tray slide pieces 71.

When the disc tray 91 of the disc drive device 3 is slid out of the apparatus body 2, the door 10 is pressed by the front surface of the disc tray 91, and is turned in the direction to open the front surface 2a. In contrast, when the disc tray 91 is slid into the apparatus body 2, the door 10 is turned in the direction to close the front surface 2a by the urging force of the coil springs 69. In this way, the front surface 2a is automatically opened and closed in response to the movement of the disc tray 91 into and out of the apparatus body 2. Therefore, after the door 10 is turned in the direction to open the front surface 2a with ejection of the disc tray 91, the user does not manually close the front surface 2a. This improves the usability. Further, since the door 10 is returned by the coil springs 69, the number of components and assembly steps, space, and sound can be reduced, compared with the structure using a driving motor or the like.

Instead of being provided for all pivot support pieces 63, for example, depending on the spring force, the coil springs 69 may be retained by two pivot support pieces 63 at both ends of the door 10, and no coil spring may be provided at the center pivot support piece 63. The resultant force of the coil springs 69 is set to be weaker than the force for ejecting the disc tray 91 of the disc drive device 3, and does not hinder sliding of the disc tray 91 and turning of the door 10.

In the concave face portion 64 provided in the front surface 10a of the door 10, the control button 80 is located. The concave face portion 64 and the transparent plate 60 clamp the control button 80. The concave face portion 64 has insertion holes 62 that communicate with the operation holes 53 of the front panel 5 when the door 10 is turned to the position to close the front surface 2a.

The transparent plate 60 is formed by an acrylic plate as an example. A front surface of the transparent plate 60 placed at the front side when the front surface 2a is closed is coated with a half mirror film, and allows recognition of the display portion 52 of the front panel 5. The transparent plate 60 also has button windows 78 from which the control button 80 clamped between the transparent plate 60 and the door 10 is exposed outside. The transparent plate 60 is bonded to and combined with the front surface 10a of the door 10 with an adhesive or the like. In this case, the transparent plate 60 and the door 10 clamp the control button 80 located in the concave face portion 64. Button portions 81 of the control button 80 protrude outside from the button windows 78.

Control Button

Figure 15:
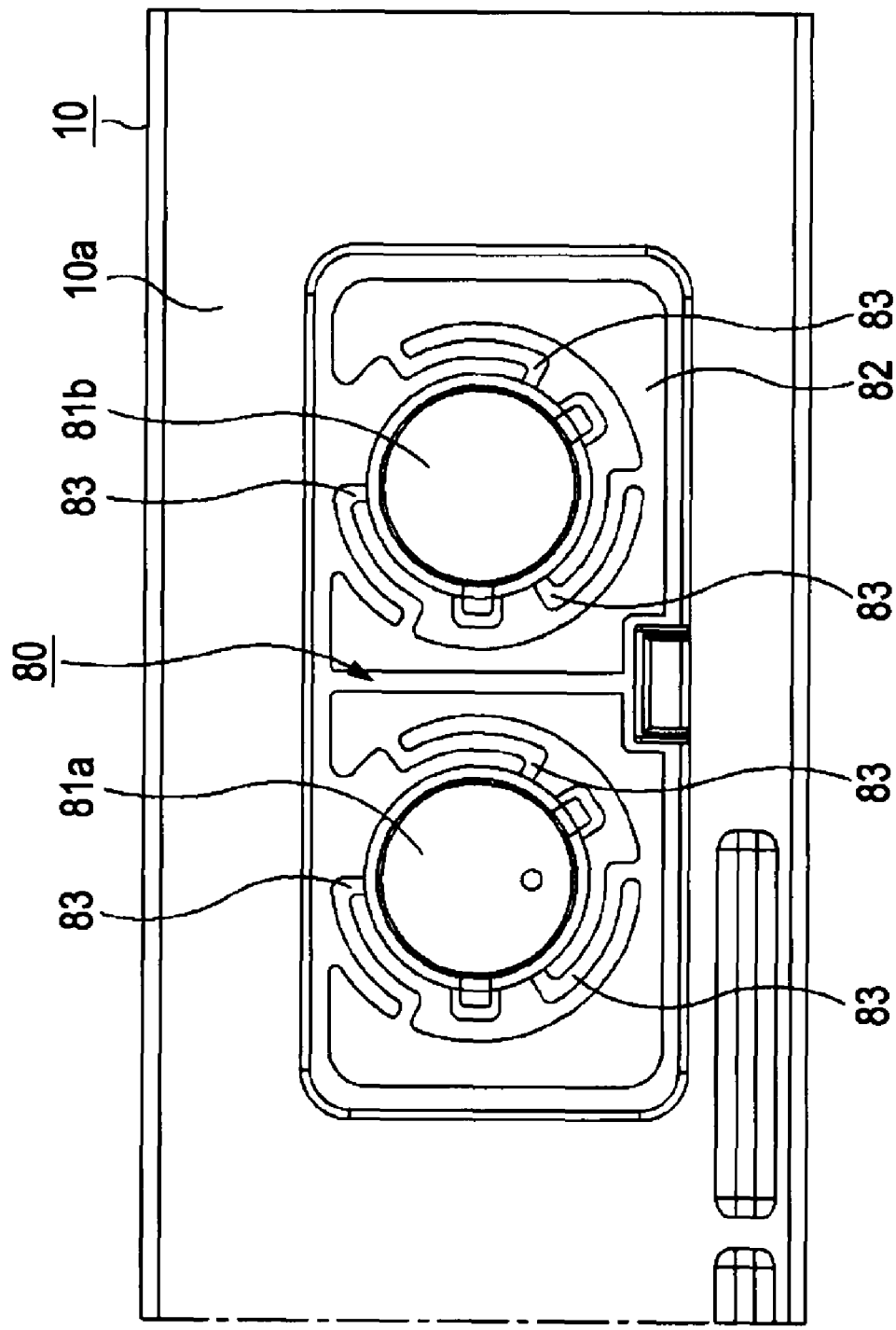
FIG. 15 is a plan view of control buttons.

Next, a description will be given of the control button 80 clamped between the door 10 and the transparent plate 60. As shown in FIG. 15, the control button 80 includes the button portions 81 and a button frame 82 for supporting the button portions 81. The button portions 81 are supported by a plurality of hinge portions 83 provided in the button frame 82 in a manner such as to be pressed.

As shown in FIGS. 10 and 15, the button frame 82 has a substantially rectangular shape that conforms to the shape of the concave face portion 64, and supports two button portions 81. One of the button portions 81 serves as a playback button 81a, and the other serves as a stop button 81b. As described above, the button frame 82 is held in the concave face portion 64 by being clamped between the door 10 and the transparent plate 60. In this case, the control button 80 is not fixed in the concave face portion 64, and is supported with the button frame 82 being placed in the concave face portion 64 and with the button portions 81 being fitted in the button windows 78 of the transparent plate 60.

Figure 17:
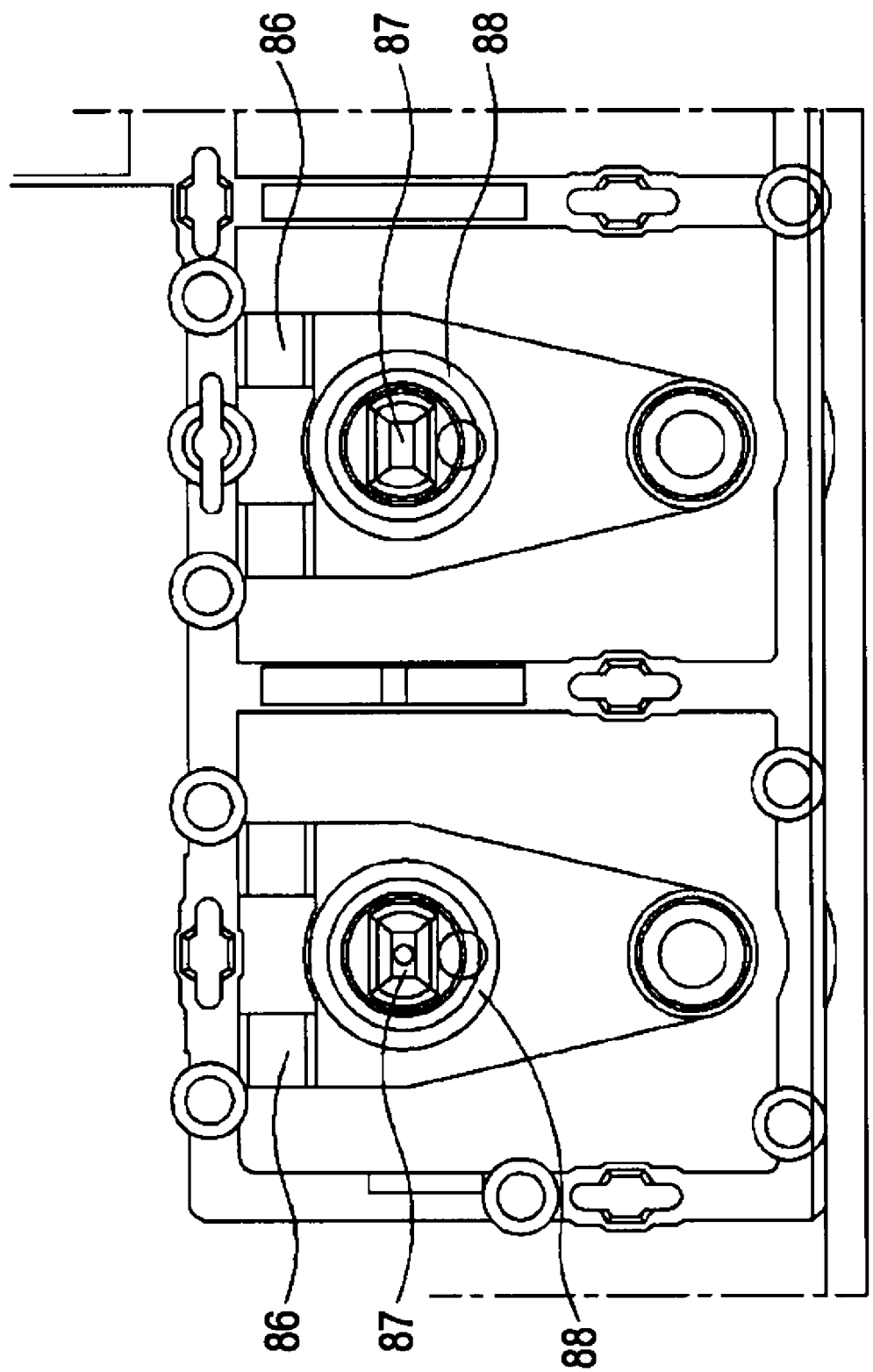
FIG. 17 is a plan view of control buttons of the related art.
Figure 18:
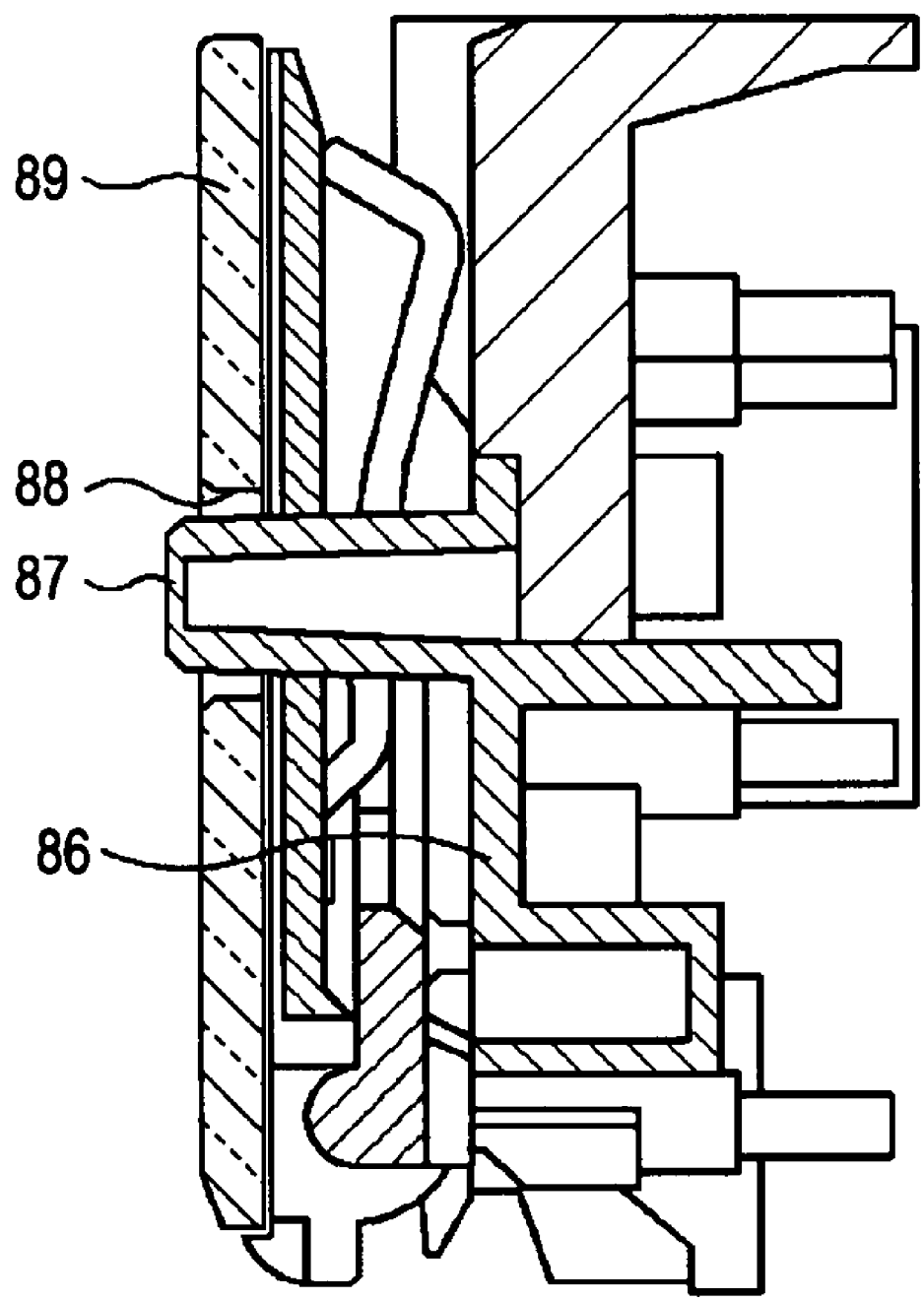
FIG. 18 is a cross-sectional view of a door using the control buttons of the related art.

The button portions 81 are supported in the circumferential direction by the button frame 82 via a plurality of hinge portions 83. Therefore, it is possible to minimize an area for pressing the button portions 81, compared with a case in which each button portion 87 is supported by a single hinge portion 86, as shown in FIG. 17. In other words, when each button portion 87 is supported by one hinge portion 86, as shown in FIG. 17, it draws a pivot locus on the hinge portion 86. Therefore, a button window 88 of a transparent plate 89 is to be larger than the button portion 87 in order to avoid interference with the pressed button portion 87, as shown in FIG. 18. Consequently, a large clearance is formed between the button portion 87 and the button window 88. As a result, the outer appearance is impaired, and dust or the like enters and accumulates in the clearance.

In the recording/playback apparatus 1, since the button portions 81 are supported by a plurality of hinge portions 83 in the circumferential direction, they draw a horizontal locus when pressed. Therefore, the button portions 81 do not interfere with the button windows 78 of the transparent plate 60 when pressed. For this reason, the button windows 78 can have the smallest possible size that allows the button portions 81 to be fitted therein, as shown in FIG. 16.

Since the button frame 82 of the control button 80 is not fixed in the concave face portion 64, it is positioned in the concave face portion 64 by fitting the button portions 81 in the button windows 78. Therefore, the button windows 78 of the transparent plate 60 are not to be larger than the button portions 81 in consideration of the margin of misalignment between the button frame 82 and the concave face portion 64, and the button windows 78 can have the smallest possible size that allows the button portions 81 to be fitted therein.

For this reason, there is little clearance between the button portions 81 and the button windows 78. This improves the outer appearance and prevents entry and adhesion of dust.

The button portions 81 are formed in a circular shape by a transparent material such as an acrylic plate, and front face portions thereof protruding outside from the button windows 78 are subjected to half-mirror finishing. The button portions 81 have operating projections 84 to be fitted in the insertion holes 62 of the concave face portion 64 of the door 10 and the operation holes 53 of the main surface portion 5a of the front panel 5 when placed in the concave face portion 64.

As shown in FIG. 20, in a state in which the door 10 is placed at the close position for the front surface 2a, the operating projection 84 of the button portion 81 is fitted in the operation hole 53 provided in the main surface portion 5a of the front panel 5, and its leading end is in contact with the pushbutton 55. Therefore, the pushbutton 55 can be directly pushed by pressing the button portion 81. Since a feeling of discomfort due to double pushing is not caused, the operational feeling can be improved.

By placing an illumination means, such as an LED, near the pushbuttons 55 of the apparatus body 2 and forming the pushbuttons 55 of a transparent material, such as acrylic, the button portions 81 of the control button 80 may be illuminated when the door 10 closes the front surface 2a.

Disc Drive Device

The disc drive device 3 provided in the chassis 4 performs recording and/or reproduction of information signals onto and/or from various disc-shaped recording media, such as CDs, DVDs, and BDs, and includes a drive housing 90 and the disc tray 91 that slides into and out of the drive housing 90.

As shown in FIG. 9, the drive housing 90 is fixed to the lower case 12 of the chassis 4. The disc tray 91 slides from the drive housing 90 toward the front surface 2a of the apparatus body 2, and moves into and out of the apparatus body 2 through the tray insertion slit 51 of the front panel 5. A disc is placed in the disc tray 91 that is horizontally moved into and out of the drive housing 90, and is automatically loaded on a turntable in the drive housing 90 when the disc tray 91 is retracted.

Door Opening and Closing Operation

Next, a description will be given of an opening and closing operation of the door 10 in response to loading and unloading of the disc in and from the recording/playback apparatus 1. When the eject button 45 provided on the top plate 6 is pressed, the disc tray 91 of the disc drive device 3 is slid out of the apparatus body 2.

Referring to FIG. 19, when the disc tray 91 is ejected from the apparatus body 2, it pushes the door 10 placed at the position to close the front surface 2a of the apparatus body 2, and turns the door 10 to the open position against the urging force of the coil springs 69. When the disc tray 91 is placed outside the apparatus body 2, it is located in a pivot area of the door 10 to restrict the pivotal movement of the door 10, and opens the front surface 2a of the apparatus body 2.

When the door 10 is turned to the open position, the operating projections 84 of the control button 80 retract from the operation holes 53 of the front panel 5, so that the operation holes 53 are exposed outside. However, since the pushbuttons 55 of the front panel 5 for pushing the control switches 56 are at the positions shifted from the operation holes 53 toward the inside of the main surface portion 5a, it is difficult for the user to operate the control switches 56 by directly pressing the pushbuttons 55 from the outside. Therefore, it is possible to avoid the circumstance in which the disc tray 91 is drawn into the apparatus body 2 and the door 10 is turned to the close position and catches the finger of the user when the user presses the playback button 81a on the front surface 2a of the apparatus body 2 in a state in which the disc tray 91 is ejected from the apparatus body 2 and the door 10 is set at the open position.

Further, since the pushbuttons 55 for pressing the control switches 56 are located on the inner sides of the operation holes 53 and are therefore difficult to be viewed by the user from the outside, the user does not have a motivation to press the pushbuttons 55 in the operation holes 53. Further, since the operation holes 53 are too small for the finger of the user to be inserted therein, it is difficult for the user to press the pushbuttons 55 only by touching the operation holes 53. Therefore, it is possible to prevent the playback operation from being performed in the state in which the door 10 is held at the open position and the front surface 2a of the apparatus body 2 is open. Thus, the finger of the user is prevented from being caught in the door 10 by automatic turning of the door 10 to the close position.

The front surface 2a of the apparatus body 2 is provided with the tray insertion slit 51, the display portion 52, and the operation holes 53 in which the pushbuttons 55 are provided, but does not have any operating means. In other words, the recording/playback apparatus 1 is not configured on the assumption that the user touches the front surface 2a of the apparatus body 2 in a state in which the door 10 is held at the open position, and assumes that operation is performed with a remote control or the eject button 45 provided on the top plate 6 is pressed. Therefore, the user does not touch the front surface 2a while the door 10 is located at the open position, and this prevents the finger of the user from being caught in the door 10.

After the disc is loaded or unloaded, when the eject button 45 is pressed or ejection or playback instructions are given from the remote control, the disc tray 91 is slid into the apparatus body 2 and moves out of the pivot area of the door 10. Consequently, the disc tray 91 releases restriction on the pivotal movement of the door 10, and allows the door 10 to be turned to the position to close the front surface 2a of the apparatus body 2 by the urging force of the coil springs 69.

In this way, the eject button 45 and the power button 46 are provided on the top plate 6, the control button 80 including the playback button 81a and the stop button 81b is provided on the door 10. Other operation means are not provided in the apparatus body 2, and the recording/playback apparatus 1 assumes that other operations, such as slow playback and selection of playback position, are basically performed with a remote control. Therefore, the door 10 is automatically turned to the open position by the disc tray 91, the disc tray 91 is retracted by selecting a playback operation with the remote control in a state in which the disc tray 91 is ejected outside the apparatus body 2, and the door 10 is automatically turned to the close position. This saves the user the trouble of manually turning the door 10.

Further, the front surface 2a of the apparatus body 2 is opened and closed by the door 10 over the entire width. Therefore, the front surface 2a of the apparatus body 2 is not divided into the door 10 and, for example, a board similar to the door 10. As a result, the numbers of components and production steps are not increased, and the outer appearance is not impaired because the division line does not appear on the front surface 2a.

When the disc tray 91 slides into the drive housing 90 and the door 10 is turned to the close position, the operating projections 84 of the button portions 81 in the control button 80 are inserted in the operation holes 53 of the front panel 5, and come into contact with the upper surfaces 55a of the pushbuttons 55. Accordingly, the control switches 56 can be pressed via the pushbuttons 55 by pressing the button portions 81 of the control button 80.

The present application contains subject matter related to that disclosed in Japanese Priority Patent Application JP 2009-044213 filed in the Japan Patent Office on Feb. 26, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A door opening and closing mechanism comprising:
an apparatus body;
a door configured to open and close a side face of the apparatus body;
a closing mechanism configured to move the door from an open position to open the side face to a close position to close the side face;
a control switch provided in the apparatus body, the control switch being operated from an operation hole opening in the side face;
a control button provided in the door and configured to press the control switch from the operation hole at the close position of the door, wherein the control switch is provided at a position shifted from the operation hole toward the interior of the apparatus body; and
a pushbutton configured to press the control switch, wherein
the control button presses the control switch via the pushbutton,
the pushbutton is provided at a position shifted from the operation hole toward the interior of the apparatus body,
the control button is in contact with the pushbutton when the door is at the close position,
a periphery of the control button is supported by a plurality of hinges, and
the control button is clamped between the door and a transparent plate stuck on a side face of the door.

2. The door opening and closing mechanism according to claim 1, further comprising:
a drive device for a recording medium provided in the apparatus body and configured to insert and eject the recording medium through the side face of the apparatus body, wherein the door is turned from the close position to the open position by being pushed by a recording-medium conveying tray in the drive device, and is turned and returned from the open position to the close position by an urging member.

3. The door opening and closing mechanism according to claim 1, wherein the door is provided over the entire width of the side face of the apparatus body.

4. The door opening and closing mechanism according to claim 3, wherein the side face of the apparatus body does not have operation means.

5. The door opening and closing mechanism according to claim 1, further comprising:
a light source configured to illuminate the control button in the door at the close position.

6. A recording and/or playback apparatus comprising:
an apparatus body;
a door configured to open and close a side face of the apparatus body;
a closing mechanism configured to move the door from an open position to open the side face to a close position to close the side face;
a control switch provided in the apparatus body, the control switch being operated from an operation hole opening in the side face;
a control button provided in the door and configured to press the control switch from the operation hole at the close position of the door, wherein the control switch is provided at a position shifted from the operation hole toward the interior of the apparatus body; and
a pushbutton configured to press the control switch, wherein
the control button presses the control switch via the pushbutton,
the pushbutton is provided at a position shifted from the operation hole toward the interior of the apparatus body,
the control button is in contact with the pushbutton when the door is at the close position,
a periphery of the control button is supported by a plurality of hinges, and the control button is clamped between the door and a transparent plate stuck on a side face of the door.

* * * * *